United States Patent [19]

Daniel

[11] Patent Number: 4,496,211

[45] Date of Patent: Jan. 29, 1985

[54] LIGHTPIPE NETWORK WITH OPTICAL DEVICES FOR DISTRIBUTING ELECTROMAGNETIC RADIATION

[76] Inventor: Maurice Daniel, 550 Jaycox Rd., Avon Lake, Ohio 44012

[21] Appl. No.: 213,462

[22] Filed: Dec. 5, 1980

[51] Int. Cl.³ .............................................. G02B 5/17
[52] U.S. Cl. .............................. 350/96.20; 350/96.24; 350/96.28
[58] Field of Search ............... 350/96.20, 96.21, 96.22, 350/96.24, 96.28, 258, 259, 260, 262, 265, 266, 269; 362/32; 126/417; 165/485, 133, 138, 144, 168, 186

[56] References Cited

U.S. PATENT DOCUMENTS

| | | |
|---|---|---|
| 1,887,650 | 9/1932 | Larner et al. |
| 2,362,175 | 10/1944 | Swanson |
| 3,195,405 | 7/1965 | Clark et al. |
| 3,453,036 | 7/1969 | Swope et al. |
| 3,508,807 | 4/1970 | Mayer |
| 3,649,098 | 3/1972 | Suverison |
| 3,655,275 | 4/1972 | Seagreaves |
| 3,710,091 | 1/1973 | Holcomb |
| 3,718,814 | 2/1973 | Van Slyke |
| 3,805,048 | 4/1974 | Brennesholtz |
| 3,886,544 | 5/1975 | Narodny |
| 3,901,582 | 8/1975 | Milton ..................... 350/96.16 |
| 3,902,786 | 9/1975 | Brown ..................... 350/96.21 |
| 3,912,362 | 10/1975 | Hudson |
| 3,912,364 | 10/1975 | Hudson ..................... 350/96.16 |
| 3,931,518 | 1/1976 | Miller |
| 3,933,409 | 1/1976 | Kloots |
| 3,933,455 | 1/1976 | Chown |
| 3,936,141 | 2/1976 | Milton |
| 3,977,764 | 8/1976 | d'Auria et al. ............. 350/96.21 |
| 4,011,005 | 3/1977 | Hawkes et al. |
| 4,021,099 | 5/1977 | Kawasaki et al. |
| 4,057,719 | 11/1977 | Lewis |
| 4,078,852 | 3/1978 | Lebduska ................... 350/96.18 |
| 4,082,435 | 4/1978 | Zeitz ........................ 350/269 |
| 4,088,387 | 5/1978 | Lewis ......................... 350/96.15 |
| 4,089,583 | 5/1978 | Auracher et al. |
| 4,092,059 | 5/1978 | Hawkes et al. |
| 4,103,154 | 7/1978 | d'Auria et al. .............. 250/227 |
| 4,135,780 | 1/1979 | Dyott |
| 4,140,367 | 2/1979 | Makuch et al. .............. 350/96.22 |
| 4,165,496 | 8/1979 | Di Domenico, Jr. et al. |
| 4,170,731 | 10/1979 | Howell et al. ............... 350/96.20 |
| 4,173,390 | 11/1979 | Käch |
| 4,184,739 | 1/1980 | d'Auria et al. |
| 4,193,661 | 3/1980 | d'Auria et al. .............. 350/96.16 |

OTHER PUBLICATIONS

"Electrostatic Light Switch," IBM Technical Disclosure Bulletin, vol. 12, No. 6, (11/69), p. 854.
"Fiber Optic Shutter," IBM Technical Disclosure Bulletin, vol. 11, No. 8, (1/69), pp. 912-913.
AUGAT advertisement, Optical Spectra Magazine, (7/78).
Carlsen, W. John and Paul Melman, "Connectors That Stretch," Optical Spectra, (10/80), pp. 41-42.

Primary Examiner—William L. Sikes
Assistant Examiner—Robert E. Wise
Attorney, Agent, or Firm—Sixbey, Friedman & Leedom

[57] ABSTRACT

Optical transmission devices suitable for use in constructing lightpipe networks are disclosed. The optical transmission devices include an optical coupler arrangement (1, 34, 72, 73) for connecting a lightpipe to other optical transmission or utilization devices with minimum interface losses. A lens element for collimating light (71, 92) may be secured to the optical coupler arrangement (1, 34, 72, 73), and two collimating lenses (84, 85) together with associated optical couplers (83, 86) may be combined to form an angular divergence reducer light travelling along lightpipes, lightpipe gates (184, 203, 214) for interrupting the flow of light along lightpipes, lightpipe switches (221-265) for directing light from a primary lightpipe to any selected one of a plurality of secondary lightpipes, and lightpipe merge devices (320-332, 360-385) for merging the flow of light from two lightpipes are all interconnected to form a light distribution system. Lightpipe diodes (300-312, 340-352) for insuring unidirectional light flow, lightpipe wall sockets (266-288) and terminators (400, 410) for capping the ends of lightpipes, optical intensity meters (290-297) for measuring light intensities inside lightpipes and lightpipe dissipaters (390-395) for dissipating excess light are added to the light distribution system to provide a complete lightpipe network (415-457) which safely and efficiently supplies electromagnetic radiation from a source of electromagnetic radiation through various main trunk and branch lightpipe lines to utilization devices.

21 Claims, 32 Drawing Figures

Complex Two-Way
Male Coupler

Simple Exit-Only
Male Coupler

Complex Two-Way
Female Coupler

Simple Input-Only
Female Coupler

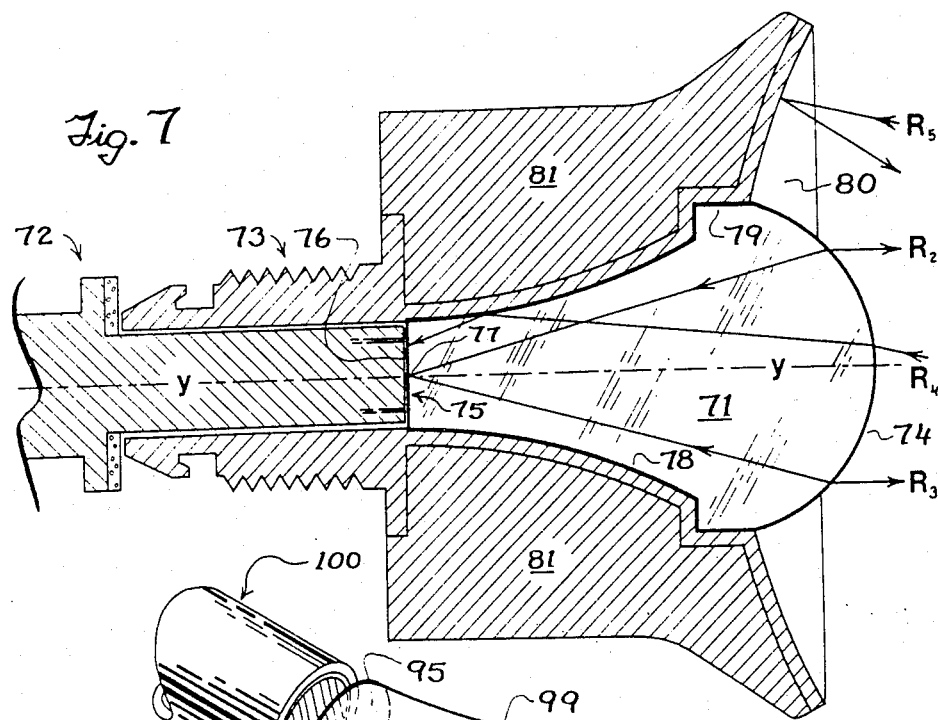
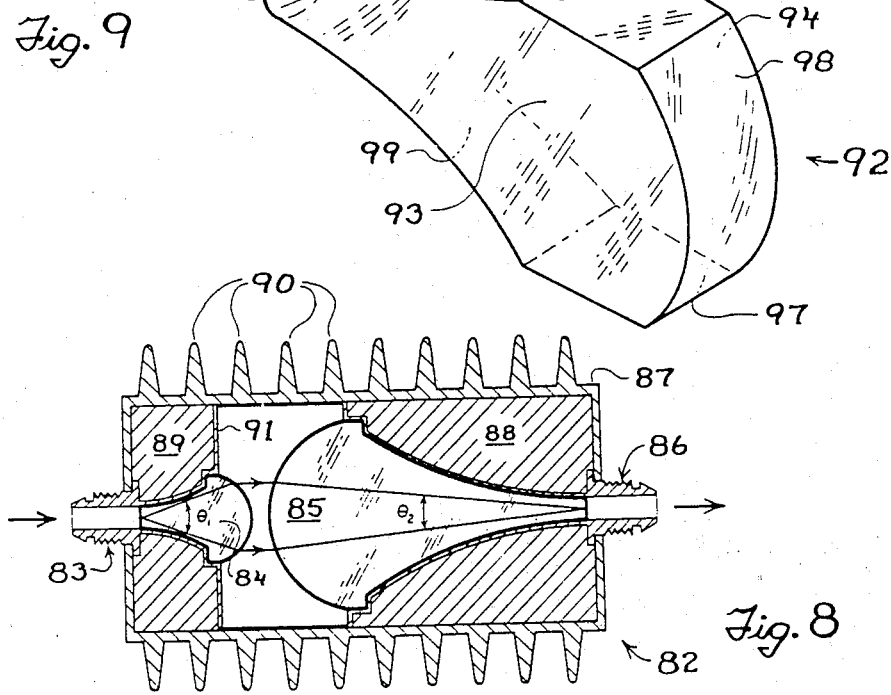

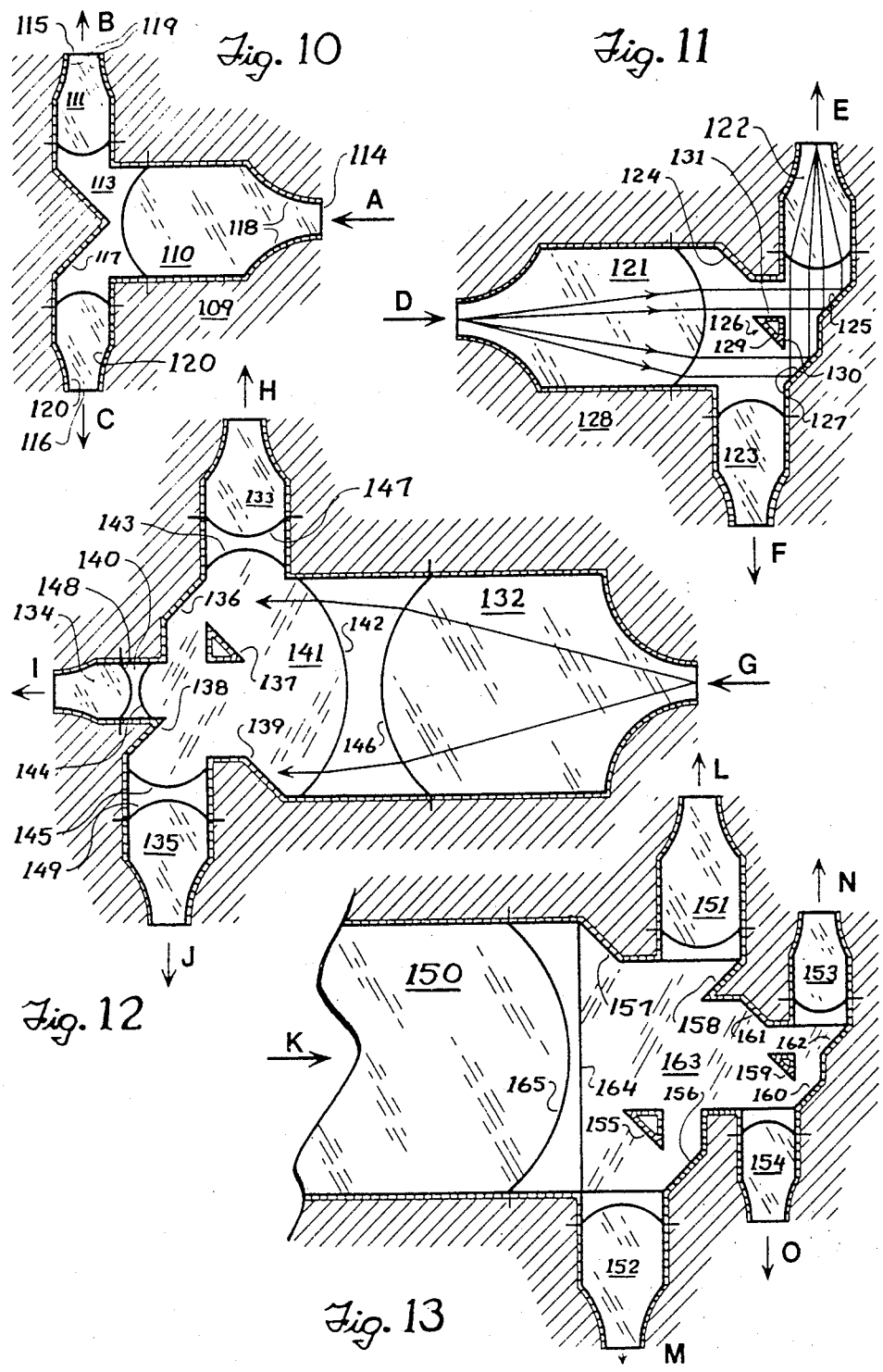

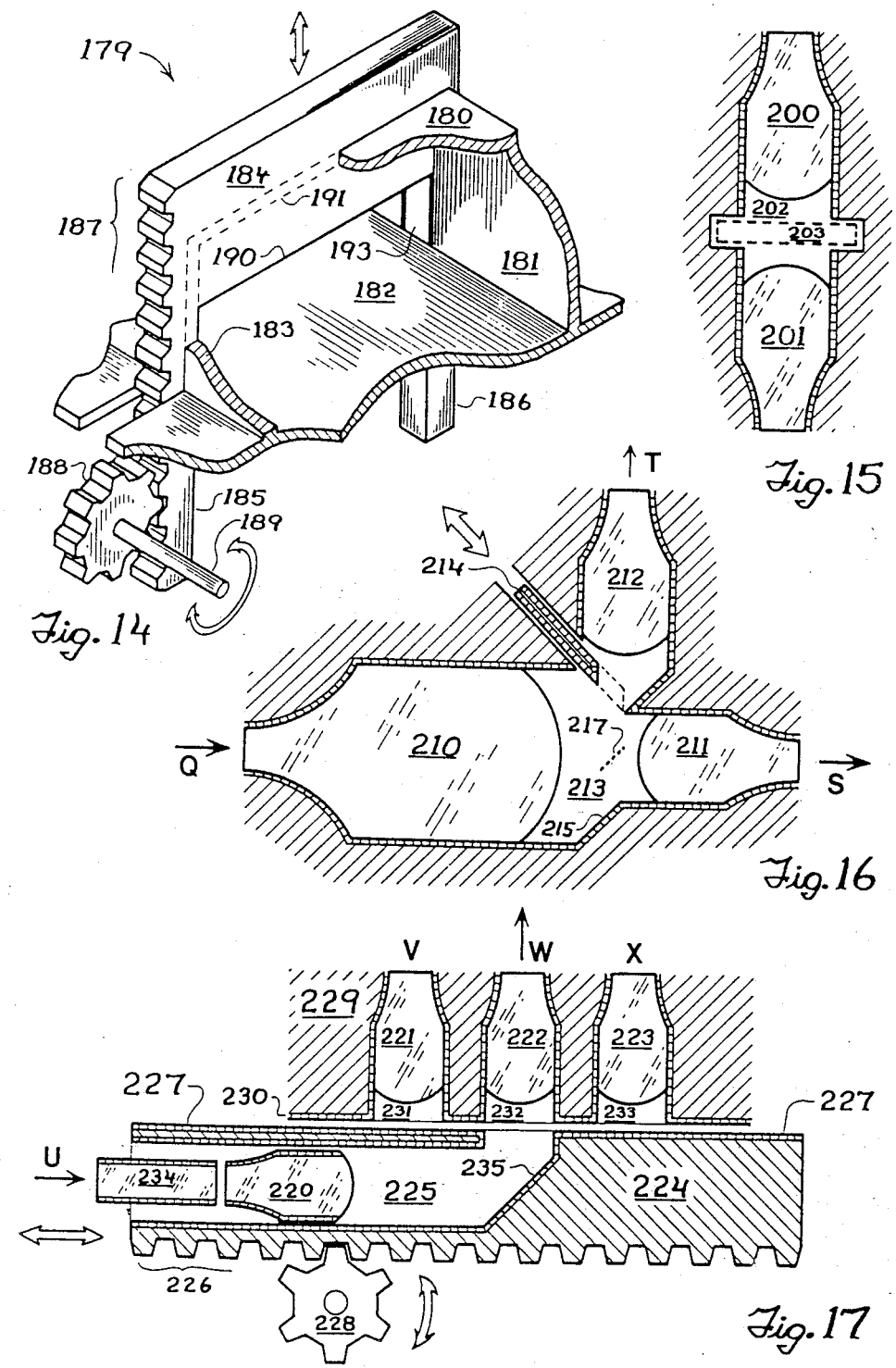

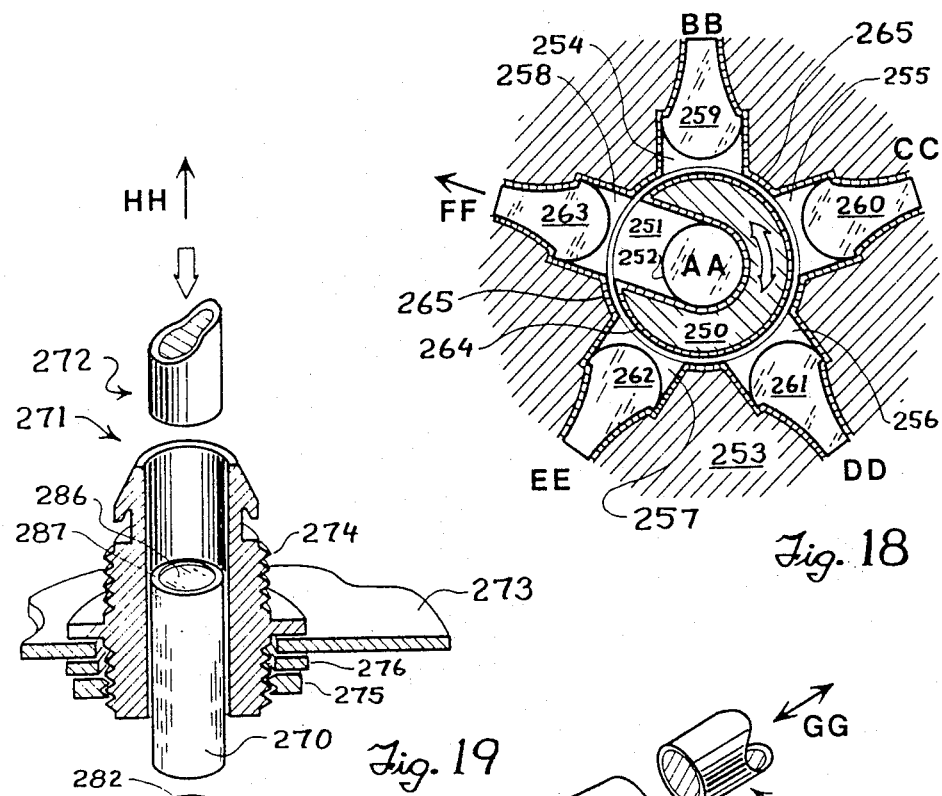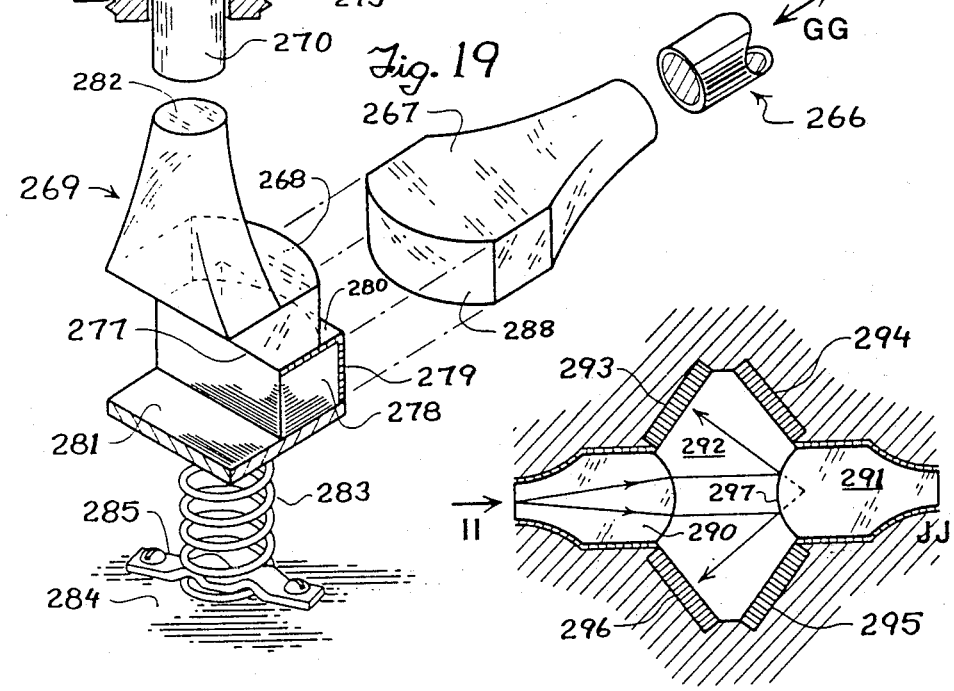

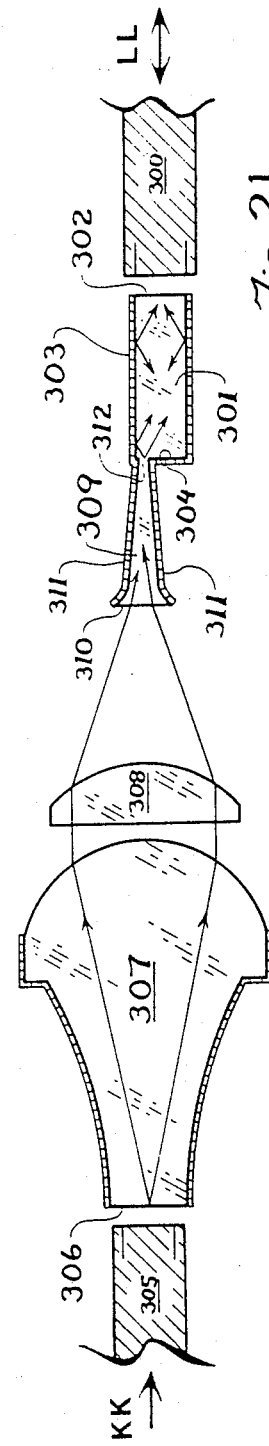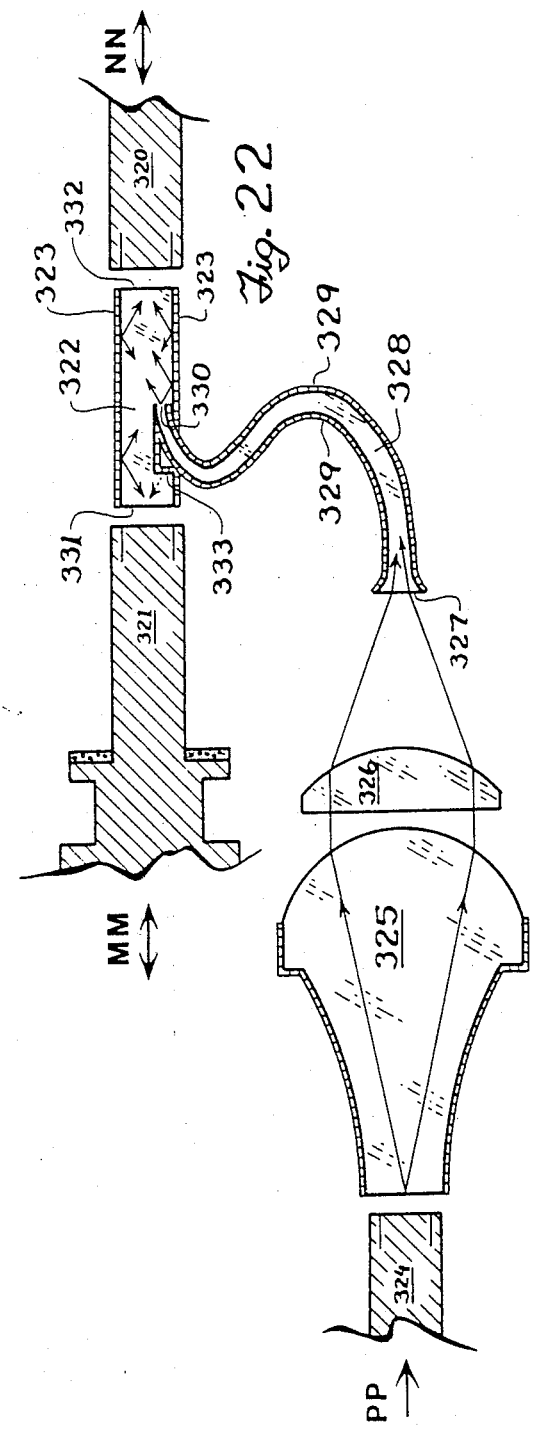

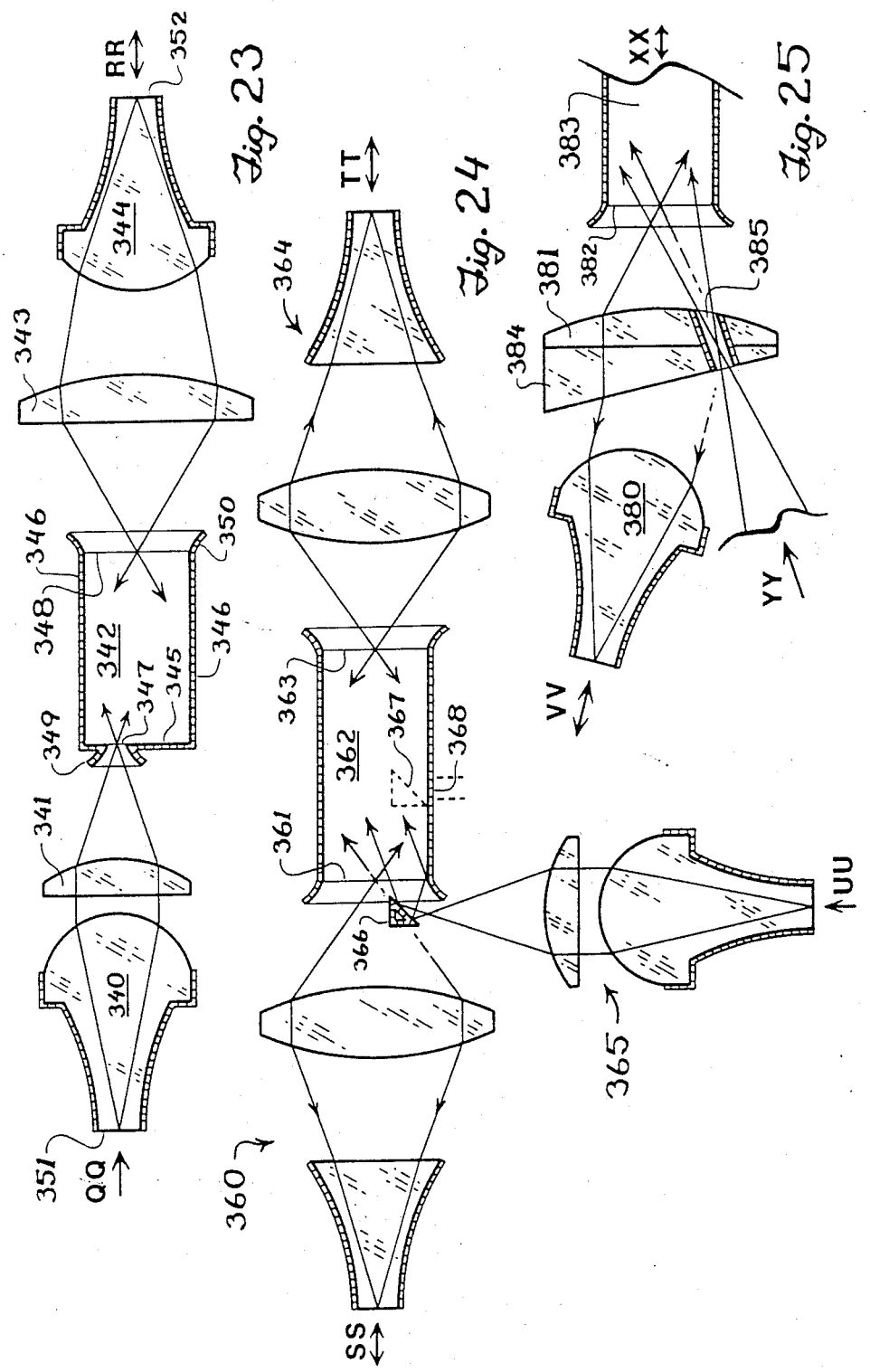

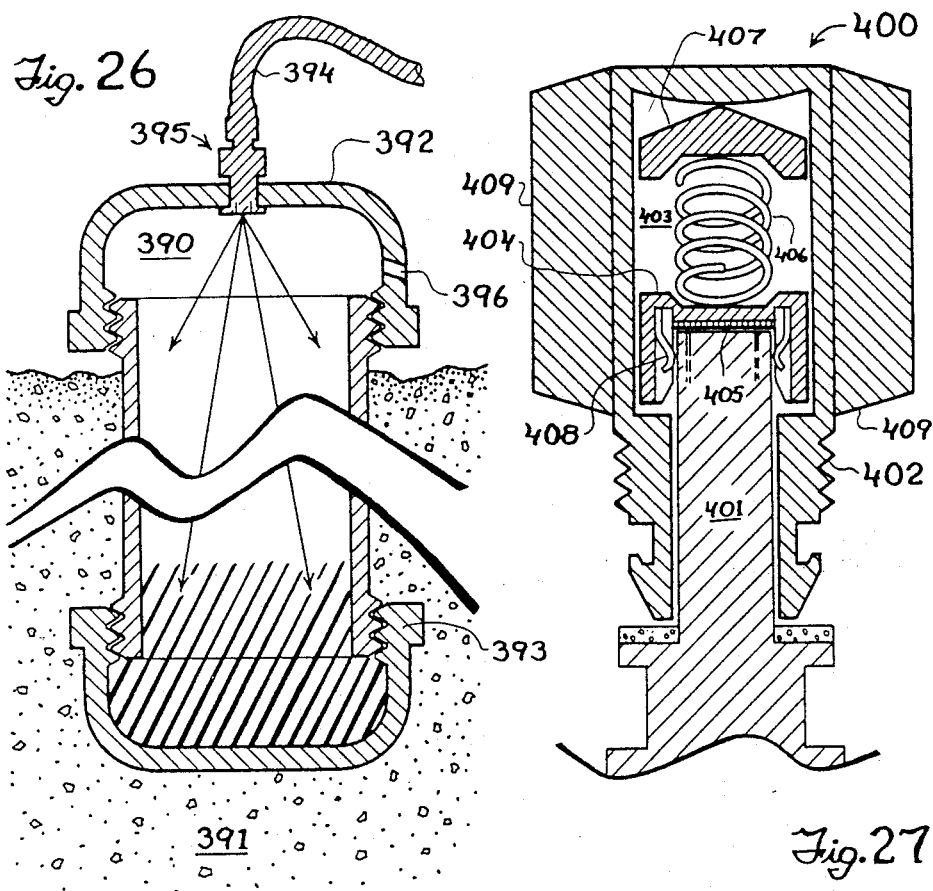
Fig. 26
Fig. 27
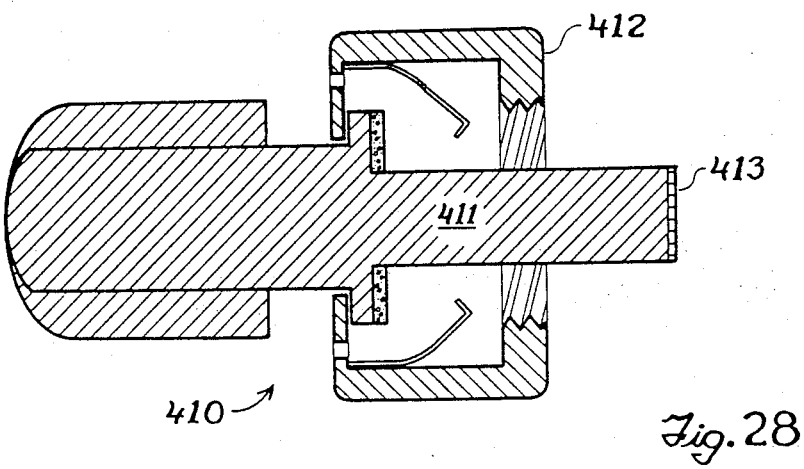
Fig. 28

LIGHTPIPE CIRCUIT DEVICES
TABLE OF SYMBOLS

SAMPLE LIGHTPIPE CIRCUIT FOR HOME OR SMALL BUILDING

LIGHTPIPE NETWORK WITH OPTICAL DEVICES FOR DISTRIBUTING ELECTROMAGNETIC RADIATION

DESCRIPTION

1. Technical Field

The present invention relates to a means for distributing electromagnetic radiation and more particularly to the provision of various optical transmission devices for use in constructing a lightpipe network to distribute light from a remote light collection or generation site to one or more optical utilization devices.

2. Background Art

Fiber optics connectors are a familiar element of fiber optics circuitry as used in communication. Such connectors are usually designed to splice two single strands of optical fiber together with a minimum loss of laser signal strength through the splice. However, the literature also provides many examples of fiber optics connectors which are used to terminate lightpipes of the type described in this disclosure. See, for example, U.S. Pat. Nos. 3,912,362; 3,655,275 and 3,649,098. Also, see the Augat advertisement in Optical Spectra Magazine, July 1978, page 29. Collimating lenses have also long been recognized as standard optical elements and have recently been adopted to directing light emerging from fiber optic lightpipes such as described in U.S. Pat. No. 4,078,852 by Robert L. Lebduska. Although the Lebduska patent recognizes the collimating lens as a useful method of directing light in some lightpipe devices it is installed as a built-in feature which lacks the universal application and design flexibility of separate female couplers.

Numerous designs for lightpipe dividers are disclosed in U.S. Pat. Nos. 4,193,661; 4,184,739; 4,078,852; 4,011,005; 4,173,390; 3,936,141; 3,933,409; 3,912,364; 3,902,786; 3,901,582; 3,508,807 and 3,453,036. Most of the lightpipe dividers of these patents fail to meet all the conditions of low light loss, complete optical path reversibility, and little increase in angular divergence of the light beam. The devices disclosed in U.S. Pat. No. 4,078,852 issued to Robert L. Lebduska and U.S. Pat. No. 4,011,005 issued to Hawkes et al. do the best job of meeting these conditions. However, because of their special geometry they are not systematically adaptable to any number of branches. Both patents describe a Y-branch divider in which all branches are equal. While this feature is useful in some applications illumination networks generally require dividers in which lightpipe branch lines feed all their light intensity to a main trunk line and none to each other. Moreover, Hawkes et al.'s device will increase the divergence of some of the light passing through to where it will no longer be contained within the critical angle of the lightpipe optical fibers while Lebduska's device fails to recapture the light which becomes misaligned while passing through the device.

The literature contains a number of examples of lightpipe valves. (See for example U.S. Pat. Nos. 4,082,435; 4,057,719; 3,886,544; 3,805,048; and 3,195,405 and also IBM Technical Disclosure Bulletins Vol. 12, No. 6, November 1969, and Vol. 11, No. 8, January 1969.) U.S. Pat. No. 4,082,435 issued to Zeitz, U.S. Pat. No. 3,805,048 issued to Brennesholtz, and U.S. Pat. No. 3,195,405 issued to Clark et al. all teach interrupting the flow of light by means of a rotating circular shutter. However, these three patents do not concern themselves with wasting light since they all involve low light intensities. Generally, the flow is interrupted with an opaque disk instead of a mirror, and the escape of some light through unsealed openings is allowed.

Only a limited number of lightpipe switches are disclosed in the literature. U.S. Pat. No. 4,088,387 issued to Lewis; U.S. Pat. No. 4,082,435 issued to Zeitz and U.S. Pat. No. 3,977,764 issued to d'Auria et al are exemplary of the prior art. A number of devices disclosed in older patents, such as that disclosed in U.S. Pat. No. 1,887,650 issued to Larner et al., are designed to distribute a beam of light among several channels. However, these older devices are not specifically designed for use with lightpipes. The Lewis patent discloses the emission of unswitched light into the surroundings, making it very unsuitable for high intensity applications. The Zeitz patent discloses both a valve and a switch and blocks the unwanted light path with an opaque sliding member, which is very wasteful of unwanted light. The valve and switch devices of d'Auria's patent are most useful in high intensity applications for they do not waste light to a first approximation. However, d'Auria's methods do not apply to switches having more than two output branches and do not provide for misaligned light. In fact, his prism method of switching will increase the angular divergence to some degree.

Examples of fiber optics metering or lightpipe intensity measuring methods are found in U.S. Pat. Nos. 4,165,496; 4,135,780; 4,103,154; 4,021,099 and 3,931,518. The devices disclosed in all five of these references are used in fiber optics communication and involve measurements of light intensity traveling through a single optical fiber, and are generally not applicable to high intensity lightpipes. In most of these patents, light beams are usually sampled in optical systems by placing beam splitter mirrors or pellicle mirrors at 45° to the light flow. The 45° mirrors are arranged to reflect only a small portion of the light flow at right angles to the main flow. The right angle flow is then measured in appropriate ways. However, no method is described in the literature that is specifically adopted for use in high intensity lightpipe circuits.

U.S. Pat. Nos. 4,173,390; 4,089,583; 4,021,099; 3,902,786; 3,901,582 and 2,362,175 all exhibit examples of lightpipe optical devices which embody some features of a lightpipe merge device. None of these patents demonstrate a simple lightpipe merge device that completely falls within the constraints imposed on such a device by the present invention. Pat. Nos. 3,902,786 and 3,901,582 meet the conditions set on high intensity lightpipe devices but they do not provide a suitable coupling means for the lightpipe lines and they demonstrate a combination merge and optical tap device instead of a simple merge. The remaining four patents demonstrate methods that are wasteful of light and generally fail to account for the backflow of light traveling in the lightpipe or optical mixers.

Several versions of a lightpipe terminator are presented in U.S. Pat. No. 4,092,059 issued to Hawkes et al., wherein light is sent into a loop of fiber optics bundle. Interface losses caused by light entering the fiber optics bundle of Hawkes et al., however, may amount to 67%, and Hawkes et al. take no special preventive action to prevent such loss.

Simple lightpipe circuits designed to carry white light for illumination have been designed, patented, and in some cases manufactured. See, for example, U.S. Pat.

Nos. 3,933,409; 3,886,544; 3,805,048; 3,718,418 and 3,710,091. However, these patents show only simple circuits consisting of a single light source, switches, dividers, and fixtures. The idea of a complete high intensity general purpose utility lightpipe network has not been anticipated and demonstrated prior to the present disclosure.

DISCLOSURE OF THE INVENTION

It is therefore an object of the present invention to provide efficient and inexpensive optical transmission devices suitable for use in constructing a lightpipe distribution network.

It is also an object of the present invention to provide an optical coupler arrangement for connecting a lightpipe to an optical transmission or utilization device with minimum interface light losses.

It is another object of the present invention to provide a male-female optical coupler arrangement including a female optical coupler structure having a unique lens element which both collimates light received from and salvages misaligned light directed toward the male optical couple structure.

It is still another object of the present invention to provide a means for reducing the angular divergence of light traveling through a lightpipe network.

It is a further object of the present invention to furnish a simple lightpipe divider for dividing the light traveling along a main trunk lightpipe line into two or more separate light beams of desired intensity for respective transmission through two or more branch lightpipe lines.

It is an object of the present invention to furnish a practical and reliable lightpipe switching device for directing light flow from a main trunk lightpipe line to any selected one of a plurality of branch lightpipe lines.

It is an object of the present invention to provide an optical gate valve for interrupting the flow of light through an optical channel.

It is an additional object of the present invention to provide a lightpipe diode for insuring the flow of light through a lightpipe in one direction only.

It is an object of the present invention to furnish a light intensity meter for use in measuring the intensity of light flowing through a lightpipe network.

It is yet an additional object of the present invention to provide a lightpipe merge device for merging the flow of light from two lightpipe lines with minimum angular divergence in the resulting merged light flow.

It is an object of the present invention to provide a lightpipe wall socket for receiving the optical coupler structure of an optical utilization device and for conducting light from the lightpipe to the optical utilization device after the optical coupler structure has been received.

It is an object of the present invention to construct a controllable lightpipe network wherein various optical transmission devices including lightpipe dividing, switching, merging, terminating and dissipating devices are employed to safely and efficiently supply light from a main trunk lightpipe line to one or more branch lightpipe lines for subsequent distribution to optical utilization devices connected to the branch lightpipe lines.

BRIEF DESCRIPTION OF THE DRAWINGS

The various features, objects and advantages of the present invention will become more apparent from the following Brief Description of the Invention, wherein:

FIG. 7 presents a cross sectional view of a female optical coupler including a collimating lens which collimates emerging light into a parallel beam;

FIG. 8 depicts a cross sectional view of a lightpipe divergence reducer housed in a lightpipe junction box;

FIG. 9 presents an isometric view of a flat collimating lens as employed in a female optical coupler;

FIG. 10 depicts a simple lightpipe Y-divider using flat thick lens to collimate the light;

FIG. 11 depicts a three-way or Y-divider having split mirrors placed to retain high center intensities;

FIG. 12 depicts a four-way divider having split mirrors and a complex molded core lens;

FIG. 13 depicts a five-way divider having split mirrors and a complex molded core prism;

FIG. 14 is an isometric drawing which illustrates an optical gate valve mechanism of the type used to interrupt the flow of light through an optical channel;

FIG. 15 illustrates in cross section the placement of an optical gate valve mechanism between a pair of flat collimating lenses;

FIG. 16 illustrates in cross section the placement of an optical gate valve mechanism in a lightpipe divider arrangement to form an optical tap with cut-off;

FIG. 17 is a cross sectional drawing of a linear three position lightpipe switch;

FIG. 18 is a cross sectional drawing of a circular five position lightpipe switch;

FIG. 19 is an isometric drawing of a lightpipe wall socket;

FIG. 20 depicts a cross sectional view of a light intensity metering arrangement;

FIG. 21 is a cross sectional view of a simple lightpipe diode;

FIG. 22 is a cross sectional view of a simple lightpipe merge device;

FIG. 23 is a cross sectional view of a high intensity lightpipe diode;

FIG. 24 is a cross sectional view of a high intensity lightpipe merge device;

FIG. 25 is a detail of an alternate embodiment of a high intensity lightpipe merge device shown in cross section;

FIG. 26 depicts a cross sectional view of a lightpipe dissipater;

FIG. 27 depicts a cross sectional view of a female lightpipe terminator;

FIG. 28 depicts a cross sectional view of a male lightpipe terminator;

For purposes of the present disclosure, the term "lightpipe" includes any elongated pipe or tubelike structure for conducting light over relatively long distances with minimum attenuation. A lightpipe, of course, is generally constructed from a plurality of individual optical fibers, sometimes numbering in the hundreds or thousands or more, which are bound together in a flexible manner and given one or more protective coatings. Unless specifically designated otherwise, however, the term "lightpipe" as employed hereinbelow also refers to such light-conducting structures as large-diameter singular optical fibers, mirror-coated flexible transparent rods or hollow flexible tubes having spaced lenses mounted therein for relaying light beams between the lenses. Each end of a lightpipe, regardless of internal structure, typically forms a flat optical surface or optical window through which light may enter or exit. Where the flow of light along the lightpipe is substantially unidirectional, the flat optical surfaces are designated as optical input and output windows in accordance with the direction of light flow. An optical coupler is secured to each flat optical surface and serves to conduct light into or out of the lightpipe depending upon whether the flat optical surface is functioning as an input or output window. Completed lightpipes may subsequently be used to optically link various transmission and utilization devices together in a lightpipe network. The term "light" as used herein includes both ultraviolet and infrared electromagnetic radiation as well as visible light. Special lenses and materials may be needed to accomodate some of the wavelengths of light under this definition.

Figure 1:
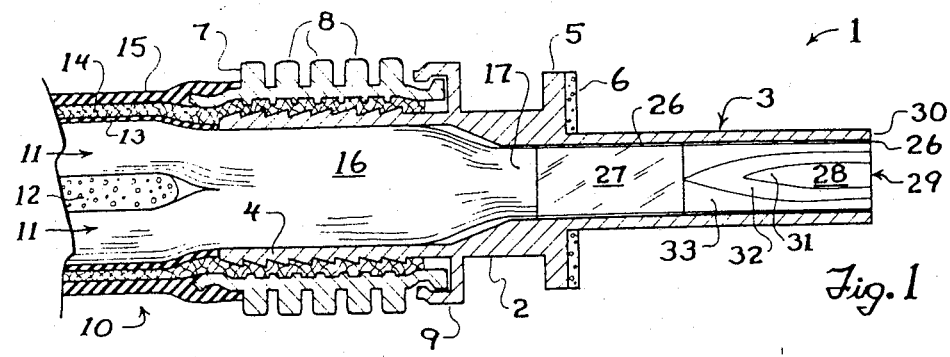
FIG. 1 is a cross sectional view of a male optical coupler suitable for use with high intensity lightpipes.

Turning now to FIG. 1, a male optical coupler for terminating a lightpipe is indicated generally at 1. Male optical coupler 1 includes a metal inner sleeve 2 having a hollow shaft section 3 and a hollow serrated section 4. Shaft section 3 is designed for insertion into a corresponding female optical coupler of the type illustrated in FIG. 3. A collar 5 formed on inner sleeve 2 limits the extent of insertion of shaft section 3, while a thin layer of plastic or other compressible material provides a protective cushion 6 which butts against the female optical coupler following the insertion operation. Serrated section 4 is designed to receive the optical fibers of a lightpipe, as will be described in greater detail hereinbelow. Male optical coupler 1 additionally includes a metal outer sleeve 7 having a series of cooling fins 8 disposed thereon for dissipating heat generated by the flow of high intensity light through the optical coupler. Outer sleeve 7 is secured to inner sleeve 2 by a crimp flange 9, as will also be described in greater detail hereinbelow. As can be seen in FIG. 1, crimp flange 9 is spaced a short distance from collar 5.

The lightpipe terminated by male optical coupler 1 is indicated generally at 10 and may be fabricated as set forth in U.S. Pat. Nos. 2,938,821 or 3,019,515. Lightpipe 10 is comprised of a plurality of optical fiber bundles 11 surrounding a soft core 12 of foam plastic or the like. An inner protective layer 13 in turn surrounds the optical fiber bundles 11. Inner protective layer 13 is fabricated from a suitably flexible, heat conducting material such as plastic. One or more layers of wire sheathing 14 bind the optical fiber bundles 11, core 12 and inner protective layer 13 together. Wire sheathing 14 may be woven in a mesh pattern, but includes at least some wires running lengthwise along the lightpipe to prevent stretching of the optical fibers. Wire sheathing 14 also serves to evenly distribute heat generated during the transmission of light and helps to transmit heat toward the outside surface of the lightpipe. An outer protective layer 15 constructed from multiple layes of fabric, plastic, or a combination thereof covers wire sheathing 14 to complete the lightpipe assembly.

The exact construction of the interface between male optical coupler 1 and lightpipe 10 will now be described in detail. As the lightpipe approaches the male optical coupler, the soft core 12 of foam plastic is removed. The bundles 11 of optical fibers are thereafter compressed into a tightly packed region 16 and ultimately fused into a single glass rod 17 within the serrated section 4 of inner sleeve 2. Inner protective layer 13 is stripped from around the optical fiber bundles at the point where the bundles enter serrated section 4. On the other hand, wire sheathing 14 is left intact until reaching crimp flange 9, completely filling the volume between the serrated section and outer sleeve 7. The previously mentioned crimping of the outer sleeve over the inner sleeve and the folding of the crimp flange over the outer sleeve firmly clamps metal sheathing 14 into place, thus furnishing a direct metallic path for the transmission of heat from the optical fibers to the air surrounding optical coupler 1. Because most of the heat associated with the flow of high intensity light through the lightpipe is generated within tightly packed region 16, the arrangement of metal sleeves and wire sheathing in the optical coupler of the present invention leads to increased efficiency in the heat dissipation process and assists in maintaining the temperatures of the various lightpipe and optical coupler components within acceptable levels.

Figure 2:
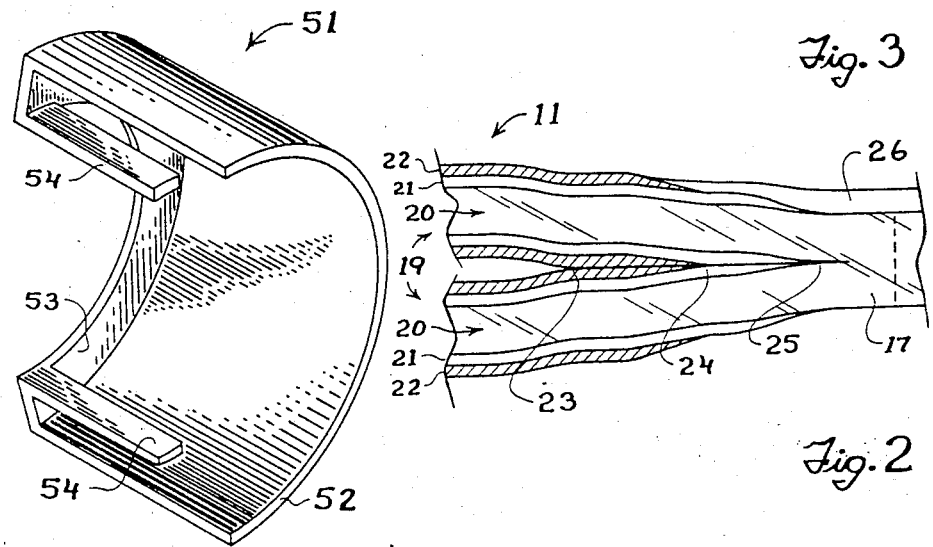
FIG. 2 shows a cross sectional view of two optical fibers inside the male connector.

Turning to FIG. 2, a portion of a bundle 11 of optical fibers confined within tightly packed region 16 is shown in enlarged cross-sectional view. The bundle 11 consists of a plurality of optical fibers 19 each having a core material 20 with a relatively high index of refraction surrounded by a cladding 21 with a relatively low index of refraction. Cladding 21 is in turn coated with a metal material 22 such as aluminum. Upon entering tightly packed region 16, the individual fibers are first bunched together as indicated at point 23. An etching process is then employed to incrementally remove the metal coating 22 from adjacent optical fibers 19 such that the metal coating tapers smoothly to a point 24. In a similar fashion, the glass cladding 21 is also incrementally removed from adjacent optical fibers beyond point 24 such that the glass cladding smoothly tapers to a point 25. Beyond point 25, the exposed individual cores 20 are fused into the single glass rod 17 by subjecting the cores to sufficient heat and pressure. The outside surface of glass rod 17 may be given a coating 26 of material having a low index of refraction in order to trap and internally reflect light travelling along rod 17. The manner of constructing the lightpipe/optical coupler interface depicted in FIG. 2 is designed to lessen interface losses within the coupler. It can be seen that light travelling through optical fibers 19 into glass rod 17 (from left to right in FIG. 2) suffers no interface loss at all, due to the fact that no abrupt or sudden terminations of the optical fibers exist to interrupt the flow of light. Moreover, interface losses for light entering the optical fibers 19 through glass rod 17 (from right to left in FIG. 2) are minimized as a result of the tapered configuration of the optical fiber cladding and coating materials. Theoretically, the termination of glass cladding 21 and metal coating 22 respectively at points 25 and 24 can eliminate interface losses completely for light flowing into the optical fibers 19. As a practical matter, of course, fabrication irregularities such as slightly squared-off tapers or air bubbles at the juncture between individual optical fiber cores permit some of the leftward travelling light rays to enter into glass cladding 21, and the interface design of FIG. 2 therefore actually exhibits small interface losses. These interface losses, however, can be kept quite small by carefully controlling the fabrication process.

Referring back to FIG. 1, glass rod 17 is followed by an optical mixer 27 mounted within the shaft section 3 of inner sleeve 2. Optical mixer 27, which may consist of a short rod of transparent glass or the like having an index of refraction equal to the index of refraction of the optical fiber core material 20, serves to eliminate "hot spots" in light flowing through male optical coupler 1 by evenly distributing the light throughout the mixer cross-section. A graded parabolic refractive index glass rod lens 28 such as the SELFOC tm lens (available from Nippon Sheet Glass Co., of Clark, N.J. completes the series of optical elements in optical coupler 1. One end of rod lens 28 is fused or otherwise attached to optical mixer 27, while the other end of rod lens 28 forms an optical output window 29 co-planar with the terminating surface 30 of inner sleeve shaft section 3. The interior of rod lens 28 is formed from a plurality of flame-shaped regions 31, 32, 33 having progressively decreasing indices of refraction. In other words, region 31 located in the center of rod lens 28 adjacent optical window 29 exhibits a relatively high index of refraction, whereas region 33 in the vicinity of optical mixer 27 exhibits a relatively low index of refraction. When light is passing from optical mixer 27 into rod lens 28 (from left to right in FIG. 1), this arrangement of regions in the interior of rod lens 28 enables the rod lens to effectively bend light toward the region with the highest index of refraction. Consequently, a relatively greater portion of light exits near the center of optical window 29 to produce a graduated intensity light beam having maximum intensity along the longitudinal axis of the beam.

In the preferred embodiment of the present invention, region 31 of rod lens 28 has the same index of refraction as optical mixer 27. Coating 26 may be extended from single glass rod 17 along the outer surfaces of the optical mixer and the rod lens to assist in trapping light inside inner sleeve shaft section 3 via total internal refraction. The portion of coating 26 disposed at the tip of shaft section 3, as well as terminating surface 30, may be covered with a mirrored surface to prevent light directed toward optical window 29 from the exterior of male optical coupler 1 from being absorbed by coating 26. In contrast, optical window 29 may be covered with a layer of anti-reflective material such as magnesium fluoride to enhance the transmission of light from the exterior of optical coupler 1 into rod lens 28.

Figure 3:
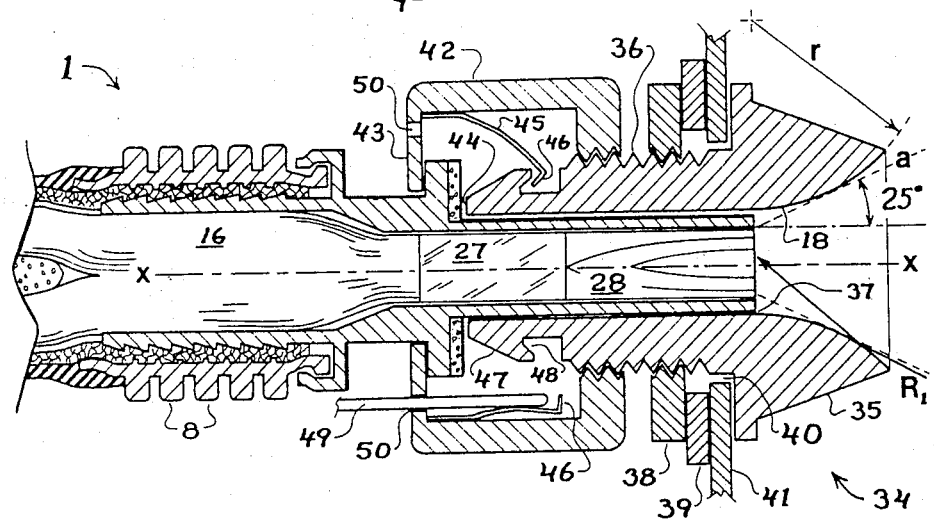
FIG. 3 is a cross sectional view of female optical coupler for receiving the male optical coupler of FIG. 1.

A female optical coupler 34 for use in receiving the male optical coupler 1 of FIG. 1 is illustrated in FIG. 3. Female optical coupler 34 includes a thickened collar section 35 joined to a threaded sleeve section 36. Both thickened collar section 35 and threaded sleeve section 36 are symmetrically constructed about a central bore 37 having a longitudinal axis x—x and both may be machined from a unitary block of metal material. A nut 38 and washer 39 assembly fitted onto a threaded sleeve section 36 is used to secure the optical coupler 34 within a hole 40 formed in a housing or panel structure 41. Central bore 37 has a diameter sufficient to receive shaft section 3 of male optical coupler 1. Male optical coupler 1 is accordingly inserted into female optical coupler 34 and a threaded cap 42 having a circumferential lip 43 slidably disposed between crimp flange 9 and collar 5 on the male optical coupler is fitted over threaded sleeve section 36 of the female optical coupler. Threaded cap 42 is then tightened until the protective cushion 6 on collar 5 is brought into contact with an abutting surface 44 on threaded sleeve section 36 to clamp male optical coupler 1 firmly in place.

Upon closer examination of FIG. 3, it can be seen that central bore 37 expands or flares within the thickened collar section 35 of female optical coupler 34 to define a surface of revolution 18 about the longitudinal axis x—x. Surface of revolution 18, which is highly polished to provide in effect a misalignment mirror for the female optical coupler, curves along a circle of radius r as seen in cross-section such that surface 18 is tangent to an imaginary cone "a" emerging from optical window 29 with an apex positioned on axis x—x and an angle of divergence less than the critical angle of the optical fibers in lightpipe 10. In the preferred embodiment of the present invention, where the critical angle is approximately 30°, imaginary cone a may be a 25° cone. This configuration permits male optical coupler 1 to capture some misaligned light rays which would otherwise be lost for useful purposes. For example, a light ray $R_1$ approaching optical window 29 from a light source to the right of FIG. 3 at an angle of approximately 25° and along a path slightly outside of imaginary cone a will strike surface 18 and reflect through optical window 29 at an angle greater than 25° but less than the critical angle of 30°. Thus, light ray $R_1$ will continue on through male optical coupler 1 and lightpipe 10 without dissipation and will be available for subsequent application to an optical device at the other end of the lightpipe. It can also be seen from FIG. 3 that additional light rays which also would otherwise be lost to useful purposes will strike the terminating surface 30 and the portion of coating 26 exposed at the end of inner sleeve shaft section 3, whereupon the light rays will reflect back toward the light surface to the right of FIG. 3 for subsequent recapture.

Two latches 45 constructed from spring metal are attached to the interior of threaded cap 42 and resiliently extend toward the longitudinal axis of female optical coupler 34. When threaded cap 42 is tightened on threaded sleeve section 36 of the female optical coupler to secure male optical coupler 1 in central bore 37, the hooked ends 46 of latches 45 are pushed outwardly along inclined surface 47 of the threaded sleeve section and snap into a circumferential groove 48, thereby locking male optical coupler 1 and female optical coupler 34 together. Threaded cap 42 can then be loosened only if the hooked ends 46 of latches 45 are removed from groove 48. To this end, a thin rod, indicated at 49, is inserted through either one of a pair of holes 50 drilled through circumferential lip 43 in registration with latches 45.

Figure 4:
FIG. 4 is an isometric drawing of a hooded latch release key tool used to disconnect the male and female optical couplers as shown in FIG. 2.

Simultaneous removal of both hooked ends 46 from groove 48 is, of course, necessary to release threaded cap 42 and disconnect male optical coupler 1 from female optical coupler 34, but such simultaneous removal is difficult to accomplish without the use of a special latch release key 51 of the type illustrated in FIG. 4. Latch release key 51 includes a shroud 52 shaped to accommodate outer sleeve 7 of male optical coupler 1. A lip 53 extends inwardly from one end of shroud 52, and two prongs 54 positioned to align with holes 50 in circumferential lip 43 of threaded cap 42 project from lip 53 in parallel fashion with respect to the surface of shroud 52. Latch release key 51 slides over male optical coupler 1 and prongs 54 are pushed through holes 50 to engage latches 45 and remove the hooked ends 46 thereof from groove 48. Lip 53 of the latch release key 51 serves as a safety stop, contacting circumferential lip 43 of threaded cap 42 to prevent the prongs 54 from being inserted too deeply into threaded cap 42 and damaging latches 45. If desired, shroud 52 of latch release key 51 may be brightly painted to warn individuals in the vicinity that the male optical coupler 1 is no longer locked to female optical coupler 2. Likewise, threaded sleeve section 36 of female optical copuler 34 may be brightly colored to provide a warning when threaded cap 42 is not securely tightened in place over the threaded sleeve section.

The male optical coupler illustrated in FIGS. 1-3 may be referred to as a complex male optical coupler inasmuch as the components employed therein are designed to handle high intensity optical energy without appreciable interface energy losses. Simple or conventional male optical couplers, on the other hand, often experience significant degrees of energy dissipation in the interface region due to the fact that the optical fibers in a lightpipe terminated by conventional male optical couplers are simply extended to the tip of the male coupler shaft, cut to length, and polished to form an optical window. Such construction leads to dissipation of optical energy within the interstitial volumes between the various optical fibers, and interstitial dissipation of optical energy in turn generates heat. Where high intensity light is supplied to a conventional male optical coupler, this heat can reach a level sufficient to damage the optical coupler or surrounding structures. Accordingly, some means for preventing conventional male optical couplers from being inadvertently inserted into female optical couplers connected to high intensity sources of light would be of great benefit in a lightpipe network.

Figure 5A:
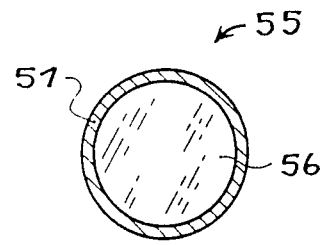
FIG. 5A is a cross sectional view of the shaft portion of a complex two-way male optical coupler of the type shown in FIG. 1.

One method of assuring proper male-female optical coupler combinations relies upon keying various simple and complex male and female optical couplers, as illustrated in FIGS. 5A, 5B, 6A and 6B. FIG. 5A is a cross-sectional view of the shaft section of a complex male optical coupler 55 similar in construction to the male optical coupler 1 of FIGS. 1-3. Complex male optical coupler 55 includes a solid glass optical element 56 such as optical mixer 27 or rod lens 28. Optical element 56 is surrounded by a smooth metal material which comprises the inner sleeve shaft section 57 of the complex male optical coupler. Corresponding complex female optical coupler 58 is shown in cross-section in FIG. 5B. Female optical coupler 58 includes a supporting metallic structure 59 such as a threaded sleeve section having a central bore 60 formed with a smooth interior surface 61. The smooth outer surface of the shaft section 57 on complex male optical coupler 55 conforms to the smooth interior surface 61 in complex female optical coupler 58 such that central bore 60 of the complex female optical coupler receives the complex male optical coupler without obstruction. Complex female optical coupler 58 may direct high-intensity light into or out of complex male optical coupler 55.

Figure 6A:
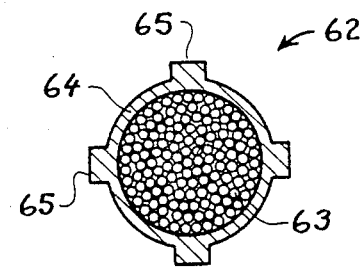
FIG. 6A is a cross sectional view of the shaft portion of a simple exit-only male optical coupler with metal keying ridges.
Figure 5B:
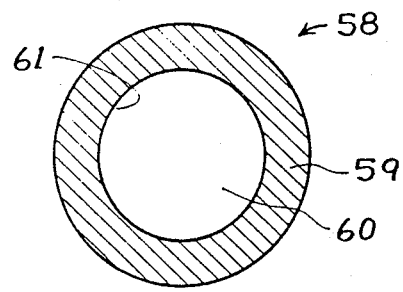
FIG. 5B is a cross sectional view of the sleeve portion of a female optical coupler for receiving the male optical coupler of FIG. 5A.
Figure 6B:
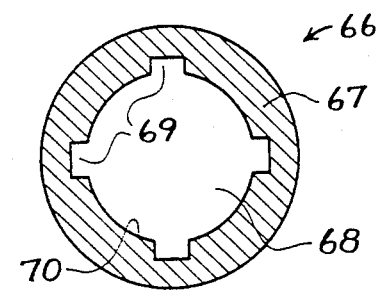
FIG. 6B is a cross sectional view of the sleeve portion of a simple input-only female optical coupler with keying slots.

FIG. 6A illustrates a simple male optical coupler 62 in cross-section. The optical fibers 63 of simple male optical coupler 62 are surrounded by a metal shaft section 64 having a series of keying ridges 65 running lengthwise along the outer surface of the shaft section. The corresponding simple female optical coupler 66 is illustrated in cross-section in FIG. 6B. Simple female optical coupler 66 includes a supporting structure 67 having a central bore 68 formed therein with a series of grooves 69 cut lengthwise along the interior surface 70 of bore 68 to mate with keying ridges 65 on the shaft section 64 of simple male optical coupler 62. Hence, the simple male optical coupler 62 may be inserted without obstruction into simple female optical coupler 66. The simple female optical coupler is connected to those sections of a lightpipe network (not shown) designed to receive only low intensity optical energy.

If the diameters of the respective shaft sections 57, 64 of the complex and simple male optical couplers 55 and 62 are made equal, it will be possible to insert the complex male optical coupler 55 into the simple female optical coupler 66 for the purpose of conducting low intensity light thereto, but the simple male optical coupler 62 cannot be inserted into the complex female optical coupler 58 because the interior surface 61 of central bore 60 in the complex female optical coupler will not mate with the keying ridges 65 on shaft section 64 of the simple male optical coupler. Consequently, the simple male optical coupler 62 cannot be connected to receive high intensity light from the complex female optical coupler 58 and the overall safety of a lightpipe network employing the arrangement of FIG. 5A, 5B, 6A and 6B is enhanced.

Numerous modifications to the male-female optical coupler arrangement of the present invention may be made in accordance with the particular use to which the optical coupler arrangement is applied or the particular environment in which the optical coupler arrangement is located. Where very high intensity light beams are transmitted along a lightpipe network, the increased levels of heat necessarily generated through random dissipation of optical energy may be more efficiently removed from the lightpipe by extending the outer sleeve cooling fins 8 on male optical coupler 1 into the interior of the lightpipe. A built-in fan or water jacket cooling means may also be placed around cooling fins 8. Optical window 29 of the male optical coupler may be polished to form a convex or concave lens surface as desired. Rod lens 28 may protrude slightly beyond terminating surface 30 of shaft section 3 or may be slightly recessed relative to terminating surface 30, or may even be eliminated entirely in some embodiments of the male optical coupler. Where optical window 29 is recessed, the exposed inner rim of shaft section 3 may be given a mirror coating and formed into a curved surface such as surface of revolution 18 in order to capture misaligned light rays. Low index of refraction coating 26 may also protrude beyond optical window 29 to continue the curved reflective surface formed along the interior rim of shaft section 3, or coating 26 may be recessed relative to terminating surface 30. Both coating 26 and shaft section 3 may be cut away in the area near optical window 29 and replaced by a collar such as collar 35 in female optical coupler 34. Rod lens 28 may be adhesively bonded rather than fused to optical mixer 27, and optical mixer 27 may be adhesively bonded to solid rod 17. In the alternative optical mixer 27 may simply comprise an extension of the core material which has already been fused together to form rod 17.

Turning to female optical coupler 34, nut and washer assembly 38, 39 may be eliminated and threaded sleeve section 36 may be directly tightened into a correspondingly threaded hole 40 in supporting structure 41. Female optical coupler 34 may also be glued, welded, riveted or otherwise permanently attached to housing structure 41 as desired. A means for adjusting the depth, vertical or horizontal positioning, or the angular orientation of male optical coupler 1 in female optical coupler 34 may be provided. An optical window can be inserted at any point along central bore 37 in the female optical coupler to prevent dust and water vapor from reaching the optical components of the male-female optical coupler arrangement. This optical window could be formed from a sheet of flat glass, or could consist of a simple lens, a Fresnel lens, or a collimating lens. The misalignment mirror formed by highly reflective surface of revolution 18 may have a parabolic, hyperbolic or elliptical cross-section rather than the circular cross-section illustrated in FIG. 2. The cross-section of surface 18 may also be constructed with alternating curved and straight sections where appropriate, or may exhibit an optimum curvature as determined by a computer. In some cases, optical losses due to misaligned light rays may be low enough to dispense with surface 18 altogether.

Male optical coupler 1 and female optical coupler 34 may be locked together by any of a wide variety of locking mechanisms. Magnetic means, a key and tumbler configuration or a built-in combination lock could all be employed for this purpose. A hinged collar could be clamped around threaded cap 42 and padlocked to prevent tampering with the optical coupler connection. The male optical coupler could be designed to snap onto the female optical coupler, thereby requiring a specialized tool to pry the male and female couplers apart. Alternatively, the male and female coupler could be semipermanently attached by gluing, welding or metal crimping techniques. Keying arrangements for allowing a complex male optical coupler to mate with a simple female optical coupler while preventing a simple male optical coupler from mating with a complex female optical coupler may employ different configurations of ridges and corresponding slots than those illustrated in FIGS. 5A-6B. The ridges may be formed on the female optical coupler and the slots formed in the male optical coupler. The slots and ridges may be tapered along their lengths or they may be wound in spiral fashion around the male shaft and female sleeve. The entire cross-sections of the shafts and sleeves may be varied. For example, simple male and female optical couplers may have four-sided cross-sections and complex male and female couplers may have eight-sided cross-sections. An eight-sided complex male optical coupler could be inserted into a four-sided simple female optical sleeve but a four-sided simple male optical coupler could not be inserted into an eightsided complex female optical sleeve.

The usefulness of the female optical coupler can be greatly extended by including a collimating lens as part of the coupler structure. This causes the diverging light beam which emerges from the male optical coupler to be collimated into a parallel beam of light which can be easily controlled by using flat mirrors instead of using more expensive curved mirrors. The central feature of the embodiment which follows is the use of a collimating lens to provide collimated light, reduce the number of optical elements, and to prevent dust and moisture from entering through the female optical coupler. A further modification is disclosed wherein the collimating lens is fabricated in a flat configuration in order to permit a great savings of space in the designs for many of the lightpipe devices which follow. A lightpipe divergence reducer is described as an example of the use of collimating lens connectors and of their placement in a special high intensity lightpipe junction box.

A full-bodied collimating lens 71 for use in connection with a male 72 and female 73 optical coupler arrangement of the type illustrated in FIG. 2 is shown in cross-section in FIG. 7. Full-bodied collimating lens 71 is fabricated from optical quality glass or the like, and is symmetrically constructed about a longitudinal axis Y—Y coinciding with the longitudinal axis of male optical coupler 72. The full-bodied collimating lens includes a spherical convex lens face 74 facing outwardly from female optical coupler 73 and an interior optical window 75 aligned with optical window 76 in male optical coupler 72. The radius of curvature of lens face 74 and the index of refraction of the optical quality glass comprising full-bodied collimating lens 71 are chosen such that light rays, indicated schematically as $R_2$ and $R_3$, entering lens face 74 parallel to longitudinal axis Y—Y from a source to the right of FIG. 7 are brought to focus at a point 77 lying in the plane of optical window 75. Conversely, light which enters full-bodied collimating lens 71 from the male optical coupler 72 travels from point 77 outward to lens face 74 and is collimated into a parallel beam, again indicated schematically as $R_2$ and $R_3$. Because most of the light leaving optical window 76 of the male optical coupler does not enter full-bodied collimating lens 71 precisely at focal point 77, some angular dispersion or spreading of the light beam formed by the collimating lens will occur. This angular dispersion, however, can be minimized by increasing the length of the full-bodied collimating lens with respect to the diameter of optical window 75. Both optical window 75 and lens face 74 are coated with optical material to reduce light losses otherwise resulting from unwanted reflection.

The outer surface 78 of full-bodied collimating lens 71 is coated with a low index of refraction material, a mirror material, or both to form a misalignment mirror similar to surface of revolution 45 in FIG. 2. The exact curvature of surface 78 is determined by the desired angular divergence imparted to light passing through the full-bodied collimating lens and by the index of refraction of the optical glass comprising the lens. Thus, a misaligned light ray $R_4$ entering collimating lens 71 is reflected off of surface 78 and approaches optical window 75 at an angle less than the critical angle of the male optical coupler. The rim 79 of the full-bodied collimating lens 71 forms an optically dead space which can be used for lens mounting purposes. The outside portion of rim 79 is given a reflective coating similar to that covering surface 78 in anticipation of the fact that some of the stray light striking rim 79 during collimating lens operation will be reflected back at usable angles.

A spherical reflector 80 is shown encircling lens face 74. This spherical reflector serves to salvage some of the light that is reflected off of any optical element facing full-bodied collimating lens 71. Where, for example, collimating lens 71 faces a second female optical coupler (not shown) identical to female optical coupler 73, a fraction of the light emerging from lens face 74 and striking the second female optical coupler will be reflected back toward full-bodied collimating lens 71 at an angle as indicated by light ray $R_5$. Use of reflector 80 will result in the redirection of light ray $R_5$ back to the second female optical coupler. Instead of travelling along a parallel path, of course, these doubly reflected light rays will enter the second female optical coupler at an angle. Nevertheless, by carefully arranging the radius of curvature of reflector 80 these rays may enter the second female optical coupler and strike the corresponding male optical coupler within the critical angle. This type of manipulation of scattered light is possible because the lightpipe networks disclosed herein transmit no image or useful communication signal which would be rendered useless by such multiple reflections.

Cooling fins 81 extend along the length of full-bodied collimating lens 71 and serve to cool the optical components of female optical coupler 73 by convection currents. The cooling fins also serve as supporting structure for the collimating lens and the reflector 80.

A lightpipe divergence reducer device 82 is illustrated in FIG. 8 to demonstrate the utilization of collimating lenses in a lightpipe device. Light enters the divergence reducer 82 through the female optical coupler 83 from the left and passes on into full-bodied collimating lens 84 which collimates the light into a parallel beam. The parallel light beam next passes into another relatively larger full-bodied collimating lens 85 which refocuses the light into female optical coupler 86. Both the left female optical coupler 83 and the right female optical coupler 86 have the same dimensions and are able to accept male couplers of the same size. However, because of the difference in size between the two full-bodied collimating lenses 84 and 85 and the placement of these two full-bodied collimating lenses relative to one another, the angle of divergence $\theta_1$ of incoming light is reduced to a smaller value $\theta_2$ before the light leaves divergence reducer 82. The absolute values of the divergence angles $\theta_1$ and $\theta_2$ vary according to the indices of refraction of the material comprising the collimating lenses so that the reducing power of the divergence reducer is best specified by the ratio of the two angles. In the present embodiment the angle of divergence is reduced to one third of its former value. Divergence reducer 82 cannot be used for light travelling in the reverse direction (from right to left in FIG. 8), since to do so would increase the angle of divergence.

The optical components of divergence reducer 82 are mounted in a housing 87 including a set of metal fins 88, 89 which both support full-bodied collimating lenses 84 and 85 and transfer heat to the walls of the housing. A second set of cooling fins 90 is provided around the outside of housing 87 to aid in transferring heat into the surrounding atmosphere by convection. The housing may be rectangular in shape and typically contains mounting brackets (not shown in this example). A reflector 91 encircles the left hand full-bodied collimating lens 84 to aid in salvaging some of the light which is lost due to reflection off of the face of the larger collimating lens 85. A reflector need not be installed around the full-bodied collimating lens 85 in view of the fact the divergence reducer 82 is designed to conduct light in only one direction. In practice the two full-bodied collimating lenses 84 and 85 are positioned very close to one another so that they touch or almost touch. This close placement helps to reduce the divergence otherwise resulting from the inability to furnish full-bodied collimating lens 84 with a true point source of light. The exposed interior surfaces of housing 87 can be polished to provide a high degree of reflectivity, and any light which escapes from the main flow of light through the divergence reducer will consequently be scattered around the inside of the housing. By chance, some of this scattered light will re-enter the main flow while the remainder will tend to uniformly heat the housing and various optical components of the divergence reducer, preventing "hot spots" and minimizing thermal expansion of the housing and components in the process.

The collimating lens of FIG. 7 is further modified in FIG. 9 to form a flat collimating lens 92 having greatly reduced volume and bulkiness. Flat collimating lens 92 is formed with flat sides 93 and 94 to provide a thickness equal to the diameter of the collimating lens optical window 95. The regions of dead space 96 and 97 have been cut flat and made parallel to one another. The lens face 98 is curved in only one dimension to form a section of a cylinder instead of forming a section of a sphere as in FIG. 7. Curved surfaces 99 initially assume a cylindrical configuration in the region of the optical window 95 but thereafter fan out to form the stem portion of the flat collimating lens.

When flat collimating lens 92 is used in a female optical coupler, light enters the optical window 95 from a male optical coupler 100 and travels toward lens face 98. It can be seen from FIG. 9 that the flat collimating lens only collimates the angular component of the light which travels in the plane parallel to flat sides 93 and 94. Light components travelling along a plane perpendicular to sides 93 and 94, however, are not collimated but, instead, travel and continue to spread until striking one of the sides 93 or 94, whereupon the perpendicularly travelling light rays are reflected back into the body of the flat collimating lens by total internal reflection and continue to travel down the flat collimating lens as they would in a solid glass rod of equal thickness. To further insure the trapping of perpendicularly-travelling light within the flat collimating lens, the sides 93, 94, 96 and 97 and curved surfaces 99 should all be given reflective coatings leaving only the optical window 95 and the face 98 uncoated.

Female optical couplers using flat collimating lenses such as that illustrated in FIG. 9 may be arranged to face one another in order to conduct light therebetween, but two high quality flat mirrors must be placed against corresponding flat surfaces of the two flat collimating lenses in order to create an effective optical channel linking the two flat collimating lenses. Light rays having one component of motion lying in a plane perpendicular to the flat sides of the lenses will begin their journey in one flat collimating lens by reflecting back and forth between sides 93 and 94 and travel between the two lenses reflecting back and forth between the two flat mirrors before reaching their destination in the second flat collimating lens, again reflecting between the two flat sides 93 and 94.

Optical housings or lightpipe junction boxes which utilize flat collimating lenses may be made correspondingly flat with a great savings of volume and bulk.

However, not all optical devices can successfully use flat collimating lenses. For example, the divergence reducer 82 of FIG. 8 must employ full unflattened collimating lenses because flat collimating lenses would not reduce the angular dicollimating vergence of light rays having perpendicular components of travel. A number of other lightpipe control devices are also restricted from using flat collimating lenses for reasons of geometry or because they in some way depend on a change in angular divergence.

The circular and flat collimating lenses of FIGS. 7 and 9 may be varied in a number of useful ways. Where heating is not a problem the cooling fin structure may be eliminated or may be shaped or placed differently than the cooling fins 81 shown in FIG. 7. Optical windows 75 and 95 may be curved to form a concave or convex lens, or may comprise a correcting lens similar to that found in a Schmidt telescope. The optical windows may be surrounded by a metal or glass rim to prevent direct contact by the male optical coupler during use. Normally, the light intensity in an optical fiber lightpipe is high near the longitudinal axis of the lightpipe and low near the periphery of the lightpipe. An input optical window having a correcting lens surface could be made that gives the resulting collimated light beam produced by the thick lens a more uniform distribution. This may prove useful in designs for dividers and other lightpipe devices. All optical surfaces may be given appropriate optical coatings for protection and to limit reflections. The lenses of FIGS. 7 through 9 form collimator lenses, but this need not be the case. The lens elements may be arranged to bring the emerging light to focus or cause it to diverge in some manner. The lens faces 74 and 98 may be convex, concave, or formed into a flat surface. In the case of the flat collimating lens, lens face 98 may be a section of a sphere instead of a section of a cylinder as shown in FIG. 9. The curved surface 99 in FIG. 9 may be characterized by complex types of curvature. Flat collimating lenses may be bent in a curve or at an angle such as illustrated in FIG. 20 without appreciably altering its optical characteristics. Where two flat collimating lenses are of equal size and face one another, additional flat mirrors may be extended between the two lenses to bridge the gaps between the corresponding surfaces 96 and 97. The space between the two lenses then becomes a rectangular, mirror enclosed optical channel. Alternatively, the space between collimating lenses may be filled with a low index of refraction plastic which acts to eliminate all air spaces while trapping light through total internal reflection.

FIG. 10 depicts a simple three way lightpipe divider having a main trunk line at A and branch lines at B and C. The figure displays only the optical components that are crucial to the control of the light. The divider housing is indicated schematically at 109, but neither the male optical couplers nor the attachment and support portions of the female optical couplers are shown. Lens elements 110, 111, and 112 are flat collimating lenses of the type described in connection with FIG. 9. Lens elements 110, 111 and 112 vary in size but have the same indices of refraction. The lens elements are connected by a mirror-lined air-filled cavity 113, where the reflective surfaces are indicated by broken white lines. During operation male optical couplers (not shown) are respectively placed against the lens element optical windows 114, 115, and 116. Despite the difference in size between the lens elements all the female optical couplers are designed to accept the same size of male optical coupler. Flat mirrors cover the flat top and bottom surfaces of the three lens elements 110, 111, 112 as well as the associated mirror-lined cavity 113.

Light entering the divider in the forward direction at A passes into the largest lens element 110 and emerges therefrom as a collimated beam of light. The beam next strikes a right angle prismodial mirror 117 which is positioned to divide the light beam exactly in half and reflect the divided beam portions directly into one or the other of the two relatively smaller lens elements 111 or 112. The smaller lens elements 111 and 112 then focus the light into corresponding male optical couplers at B and C. If A, B, and C were point sources of light of one color, this arrangement of optics would divide the light beam from A without increasing its angular divergence. Since this is not the case some angular divergence will take place. However, the mirror-lined cavity 113 allows no escape of stray light and the reflective surfaces 118, 119, 120 help to direct some of the scattered light back into the main flow.

The light flow through this divider is completely reversible. All light which enters at B will emerge from the main trunk line at A. All light which enters at C will also emerge at A. There is no cross over between the branch lines B and C. If a mirror were placed at C, then half the light which entered A would pass through the male optical coupler at B and the other half would be reflected off of the mirror at C and travel back into the male optical coupler at A in the reverse direction.

The divider of FIG. 10 can be designed to unequally divide the flow emerging from A into the lines at B and C. For example, this can be accomplished by shifting the right angle prismodial mirror 117 toward C by a small amount and by then placing a correspondingly larger flat collimating lens at B and a correspondingly smaller flat collimating lens at C. B will then receive more light than C. If the angular distribution of the light entering from A is exactly known, then the geometry can be arranged to give a predictable distribution of light between branch lines B and C.

FIG. 11 depicts an alternate arrangement of a lightpipe divider using a split mirror system. In most respects the embodiment of FIG. 11 is similar to that of FIG. 10. The main trunk line is at D with branch lines at E and F. Lens elements 121, 122 and 123 are flat collimating lenses similar in construction and function to lens elements 110, 111 and 112 of FIG. 11. Four small flat mirrors 124, 125, 126 and 127 oriented at 45° angles relative to the longitudinal axis of lens element 121 are used to divide the light from trunk line D in split fashion between the branch lines E and F. Mirror 126 is attached to the divider housing 128, and the three exposed surfaces 129, 130, 131 of mirror 126 are all coated with a reflective material. Angled mirror surface 129 serves as one of the four beam splitting mirrors while the other two mirror surfaces 130, 131 serve only to channel stray light back into the main flow. Two pairs of light rays are drawn in FIG. 11 to illustrate how light entering at D is split into four portions, two of which are reflected into branch line E and two of which are reflected into branch line F. One quarter of the light from line D strikes a mirror 125 and is reflected into line E while a second quarter strikes mirror 127 and eventually enters line E. Likewise, portions of the light striking mirrors 124 and 126 are reflected downward to eventually enter line F. As with FIG. 10, the light flows can be reversed so that light entering either E or F or both is reflected by the mirrors into line D.

The flow of light into the E and F branch lines can be made unequal by adjusting the sizes of the four mirrors and the lens elements 122 and 123 as previously described in connection with FIG. 10.

If light travelling down a lightpipe had the same intensity at all angles of divergence up to some maximum or critical angle, then the lightpipe divider of FIG. 10 would be adequate for most purposes. Unfortunately, this is not always the case. Many lightpipes transmit far more light at low angles of divergence than at large angles of divergence. Consequently, most of the light entering from trunk line A in FIG. 10 will travel along the center of lens element 110 and will strike the apex of right angle prismoidal mirror 117. It can be seen that light reflected from the apex of mirror 117 arrives at the sides of the lens elements 111 and 112 and is then focused on the respective optical windows 115, 116 at relatively large angles of incidence with respect to the optical windows. Hence, the lightpipe divider of FIG. 10 tends to undesirably increase the overall divergence of the light flow in those lightpipes which conduct the greatest intensity of light along the lightpipe centers. The beam splitting method of FIG. 11, however, compensates for this problem by dividing the emerging beam so that high intensity low divergence light from D is sent to branch lines E and F through the center portions of lens elements 122 and 123, where much less divergence is produced. This design feature works for light travelling in the reverse direction as well.

FIG. 12 depicts a four way lightpipe divider in which light entering the trunk line at G is split among three branch lines at H, I, and J. Four specially designed flat collimating lenses 132, 133, 134 and 135 of various sizes as discussed in more detail hereinbelow are provided at each of the entry ports G, H, I, and J. The light beam emerging from G is divided up into five portions. Four portions of the light beam are reflected by mirrors 136, 137, 138 and 139 into the H and J branch lines using the same beam splitting arrangement illustrated in FIG. 11. The center, or fifth, portion of the beam entering from G travels directly to the flat collimating lens 134 and branch line I without being reflected by mirrors.

If the four mirrors 136, 137, 138 and 139 have the same dimensions and the two lenses 133, 135 are the same size the amount of light entering the H branch line will equal the amount of light entering the J branch line. The relative amount of light sent into the I line is dependent upon the width of the channel 140 leading to flat collimating lens 134 and upon the angular distribution of the light intensity entering from trunk line G. Thus, in order to divide the light from trunk line G equally among the three branch lines H, I and J it is necessary to know the exact angular distribution of the light entering G and to assign accordingly dimensions to the flat collimating lenses and mirrors of the system. The same procedure must be followed to design a three branch divider that predictably divides the light unequally among the H, I and J lines.

If desired, all of the mirrors 136, 137, 138 and 139 can be constructed as a single molded optical element 141. Optical element 141 also includes a series of optical windows 142, 143, 144, 145 formed as cylindrical lenses to respectively oppose lens faces 146, 147, 148 and 149 of the flat collimating lenses 132, 133, 134 and 135. Having all the mirrors molded into one part lowers the fabrication cost. But the most important advantage of this particular arrangement is that light entering from any of the trunk or branch lines must pass through two curved surfaces before reaching the mirrors 136, 137, 138 or 139. The path of one pair of light rays is seen travelling toward the mirrors from line G. These light rays do not become fully collimated until they pass through both lens face 146 and optical window 142. Having two such surfaces allows the length of the flat collimating lenses 132, 133, 134 and 135 to be shortened. This principal can be used to shorten the dimensions of the entire lightpipe divider.

FIG. 13 depicts a lightpipe divider having a main trunk line K and four paired branch lines L, M, N and O. A relatively large flat collimating lens 150 receives light from trunk line K and thereafter distributes light to the branch pair L and M by way of four mirrors 155, 156, 157 and 158 and smaller flat collimating lenses 151 and 152. Simultaneously, light is distributed to branch pair N and O by way of mirrors 159, 160, 161 and 162 and flat collimating lenses 153 and 154. Each branch pair grouping of flat collimating lenses and mirrors is similar to the grouping of lenses 122, 123 and mirrors 124, 125, 126 and 127 in FIG. 11. The N and O grouping is made smaller than the L and M grouping because the N and O grouping receives most of the high intensity light passing through the center of flat collimating lens 150 from the trunk line K. The individual optical components in each grouping are sized and arranged to insure the equal division of light between individual branch lines in each grouping, but the angular distribution of the light in the various flat collimating lenses has to be taken into account if equal light distribution is desired between the two groupings. Unequal distributions of light intensity can be achieved by using mirrors and lenses all having different sizes.

As in FIG. 12, mirrors 155–162 may be combined into a single molded optical element 163. In FIG. 13, all optical windows such as optical window 164 leading into molding element 165 are flat, making the design of element 165 simpler and less expensive than the design of element 141. The flat optical window 164 facing the convex lens face 165 of flat collimating lens 150 helps to reduce reflection losses by causing light reflected from the flat optical window to reenter flat collimating lens 150 and main trunk line K.

The methods of designing lightpipe dividers as illustrated in FIGS. 10–13 may be applied to dividers having any number of branches. For example, a divider having two branches where one is a primary branch which directly faces the trunk line (such as I faces G) and the other is off to the side and fed by two split mirrors is possible. The flat collimating lenses are all shown lying flat in the same plane. Variations are possible where flat collimating lenses face one another edge on. The flat collimating lenses can also be angled relative to one another and prisms, additional mirrors, or lenses can then be employed to transmit light between the two collimating lenses. The air filled chambers in the dividers may be replaced by corresponding solid low index of refraction optical elements. More complex split mirror combinations are possible. More than two mirrors per branch lens may be used to insure more controlled distributions of light. All of the mirrors of FIGS. 10–13 can be considered to be in a single layer, but other embodiments are possible having more than one layer. Using several layers of multiple mirrors, closely controlled distributions of light can be achieved without knowing the exact angular distribution of the incoming light. Using three layers, with five mirrors per layer and each layer separated by a very thin mirror coating, it is possible to achieve a nearly perfect threeway distribution of the incoming light among three branch lines without knowing the angular distribution of the incoming light. The mirrors can be angled at other than 45° if desired, or they may be slightly curved. In limited cases it is possible to use collimating lenses that are neither circular nor rectangular in cross section in fabricating a divider; such as using three or six sided collimating lens which are carefully matched to one another in a three dimensional geometry. Baffle mirrors for keeping slightly misaligned light within prescribed channels may be added where needed within the body of the divider.

FIG. 14 illustrates an optical valve 179 which can be used to stop light from travelling along a lightpipe network by reflecting the unwanted light back to its source. Light passes through a rectangular channel formed by metal surfaces 180, 181, 182 and 183, which for the most part have been cut away in FIG. 14 to better reveal the operation of the optical valve. The metal surfaces 180, 181, 182, and 183 are highly reflective to light and together form a light channel extending for some distance on either side of the optical valve. A gate apparatus 184 is supported between two legs 185 and 186 which slide in grooves (not shown). Motive force to move the gate up or down is supplied by a linear gear 187 machined at one end of gate 184 and circular gear 188 interconnected as shown. The small circular gear 188 is rotated in either a clockwise or counter clockwise direction by a shaft 189. The shaft may be rotated by a knob in the case of hand operation or may be rotated by an electric motor in the case of electrically controlled operation. The downward motion of gate 184 is brought to a stop when the lower edge 190 of the gate touches the mirror surface 182. The upward motion of the gate 184 is brought to a stop by a mechanical stop element (not shown) when the lower edge 190 reaches the level of the upper mirror surface as indicated by dashed line 191.

In particular it should be noted that there are no openings in any of the surfaces 180, 181, 182 or 183 for light to escape. The exposed portions of the legs 193 supporting gate 184 are given highly reflective coatings. The front and back surfaces of the gate 184 and the bottom edge 190 of the gate are also made highly reflective. When gate 184 is in a fully opened position, light passes through optical valve 179 in either direction without obstruction. In the fully closed position, light from either direction encounters the mirror-like surfaces of gate 184 and is reflected back toward its source. When the gate 184 is part way down, some light continues through optical valve 179 while other light is reflected back toward its source.

FIG. 15 shows the position that an optical valve may occupy in a lightpipe junction box. Two similar flat collimating lenses 200 and 201 are positioned to face one another across either end of a rectangular channel 202 having reflective interior walls. The light channel is intercepted by an optical valve 203 of the type illustrated in FIG. 14. Because the light travelling between the two flat collimating lenses 200 and 201 usually exhibits a greater intensity along the line joining the centers of the two lenses, having the gate travel in a direction perpendicular to the plane of FIG. 15 rather than parallel to the plane of FIG. 15 provides a very nearly linear cut-off of the light from full on to completely off.

FIG. 16 illustrates the placement of an optical valve in a modified lightpipe divider device. Light entering the main trunk line at Q is divided and exits through lightpipe lines S and T. The lightpipe divider includes flat collimating lenses 210, 211 and 212 mounted within a central mirror-lined channel 213. This two branch divider forms an optical tap device whereby the main light flow is straight through the device from Q to S. Mirrors 215 and 216 direct a small part of the light flow into the tap line T. A small Pellicle mirror or beam splitter 217 may be placed in the center of the main light flow to direct additional light into the tap line T. A gate valve 214 is positioned at a 45° angle with respect to the flow of light entering collimating lens 212. By partly closing or fully closing gate valve 214 the light flow entering the tap line T may be diminished or cut-off completely. Light reflected by the gate valve is sent back through the main trunk line Q as a back flow. This particular arrangement causes a fixed ratio of light to be sent into the S line regardless of the setting of the gate valve 214.

The lightpipe gate valve of FIGS. 14, 15 and 16 can be given a wide variety of configurations. The mirror/gate means can cut across the optical beam from side to side or from top to bottom. It may cut into the light beam at an angle (as it does in FIG. 16) and it may be designed to only extend part way across the light beam. Two or more mirror/gates may be made to move in synchronization across a collimated light beam in a split mirror configuration. The gate may be cut at an angle along its length or along its width. The gate may be curved in the shape of a cylinder or even a section of a sphere. The gate may be wedge shaped along its length or height or width. The gate may have various types of mirror-lined holes placed through it. The mirror-lined channel that is intersected by the gate need not have a rectangular cross-section. It may have a circular cross-section, or have any other closed geometric shape. Generally gate valves are used to control the flow of collimated light, but this need not always be the case. A mirror-lined optical channel may be used to carry non-collimated light just as lightpipes carry non-collimated light. Such a channel is usually referred to as an optical mixer. A gate valve as described herein could be used to cut off light flow through such an optical mixer device without increasing the angular divergence of the light.

A lightpipe switch having an input line at U and output lines at V, W and X is illustrated in FIG. 17. A fixed element 229 respectively supports three flat collimating lenses 221, 222 and 223 within mirror-lined optical channels 231, 232 and 233. Fixed element 229 also contains a flat mirrored surface 230. A movable element having a mirror-lined optical channel 225 formed therein and a linear gear 226 cut along one side thereof slides to the left or right with respect to fixed element 229 in response to the actuation of gear 228. A mirrored surface 227 facing mirrored surface 230 of fixed element 229 and the movable element 224 may be secured within a suitable housing (not shown).

Light enters the lightpipe switch from input line U through a glass rod 234 having a reflective or low index of refraction coating around its outside to trap light within it as it passes through on its way to a flat collimating lens 220. In practice the glass rod 234 and the flat collimating lens 220 may be fused together as a single element, and the left side of the glass rod is attached to a female optical coupler. The female optical coupler is in turn secured to the lightpipe switch housing (not shown), thus fixing elements 234 and 220 with respect to moveable element 224. In other words, as the element 224 slides to the left or right, the flat collimating lens 220 remains immobile inside the moving channel 225. Light entering at U passes through the glass rod 234 and into the flat collimating lens 220 where it is collimated and sent into the mirror lined optical channel 225. The light beam next strikes a 45° mirror 235 positioned at the end of channel 225 and is reflected upward into one of the output lines V, W or X. In FIG. 17, the light is shown as passing into optical channel 232 and striking the flat collimating lens 222, whereupon the collimated light is focused into output line W. This entire optical path, from U to W in this case, is reversible; light may travel in either direction with equal ease. None of the optical elements used in this switch contribute to increases in the angular divergence of the light. Moreover, if the distance between the surfaces 227 and 230 and the distance between flat collimating lens 220 and the walls of optical channel 225 are kept small, the light losses can be kept very small.

It is important to note here that light may be switched from one channel to the next while light is passing through the device. For this reason the two surfaces 227 and 230 are given a highly reflective coating. When the moveable element 224 has slid over between two output lines, as for example between lines W and X, light from U that does not reach either optical channel 232 or 233 will strike the mirror surface 230 between them and be reflected back toward U as a backflow. The same applies for light coming in a reverse direction from any of the ouput channels V, W, and X. If the light flow is not aligned with the sliding channel U, light will be reflected off of the mirror surface 227 and back out of the output channel.

For simplicity a number of mechanical parts have been omitted from the drawings. A set of mechanical stops, however, would normally be arranged on either side of the moving element 224 to prevent channel 225 from moving beyond the two optical channels 231 and 233 at either end of fixed element 229. All optical channels and flat collimating lenses are enclosed by flat mirrors on the sides not shown in the cross-sectional view of FIG. 17. The gear 228 may be rotated by a knob for hand operation or it may be connected to an electric motor or the like for electrically controlled operation. Mechanical means would also be provided to ensure that optical channel 225 is easily positioned and aligned with the various output lines. The entire mechanism and optics of this device are enclosed in a junction box housing cooling means.

A circular embodiment of a lightpipe switch is shown in FIG. 18, wherein an input line AA is positioned to send light to one of five output lines, BB, CC, DD, EE or FF. A rotating element 250 containing a mirror-lined optical channel 251 with a 45° mirror 252 mounted at one end thereof communicates with input line AA, while a fixed supporting structure 253 containing a plurality of mirror-lined optical channels 254, 255, 256, 257, 258 communicating with the five output lines encircles rotating element 250. Full-bodied collimating lenses 259, 260, 261, 262, 263 of the type illustrated in FIG. 7 are respectively secured within the mirror-lined optical channels 254-258. Light from input line AA first enters an input collimating lens (not shown) lying above the plane of FIG. 18 in fixed position relative to rotating element 250. The input collimating lens directs the light onto 45° mirror 252, whereupon the light is bent into the plane of FIG. 18 and reflected into the mirror-lined optical channel 251. Rotating element 250 is then rotated to align optical channel 263 with a selected one of the optical channels 254-258 in fixed supporting structure 253 and the light path through the circular switch is completed. In FIG. 18, the FF output line has been selected so that collimating lens 263 receives the light from input line AA and focuses it out through line FF. It can be seen that outer wall 264 of rotating element 250 is a mirror that reflects light back toward its source on output lines that are not connected to the input line AA. Curved mirror segments 265 are placed between the various optical channels 257-261. Because mirrors 264 and 265 must be curved mirrors they contribute to increasing the angular divergence of any light which may strike them. As before the rotating element 250 may be moved by means of gears, or since it is already mounted to a circular shaft (not shown), it may be rotated directly by a hand operated knob or an electrically driven step motor, or solenoid and ratchet means.

An isometric drawing of a lightpipe wall socket is illustrated in FIG. 19. Light enters the device through a male optical coupler 266 at GG. The light is then collimated into a parallel beam of light by the flat collimating lens 267 and is sent into the lens face 268 of a bent collimating lens 269. Bent collimating lens 269 redirects the light beam upward and focuses it through optical window 282 and into the glass rod 270 secured within female optical coupler 271. Light emerging from the glass rod 270 enters the male optical coupler 272 which is part of line HH leading to some lighting fixture or appliance.

The female optical coupler 271 is shown in detail in cut-a-way. The upper portion of the female optical coupler 271 extends beyond the wall 273 and into a room (not shown). It is necessary that the female coupler extend beyond the wall far enough to expose threaded sleeve 274, which threaded sleeve receives a threaded cap (not shown) to clamp male optical coupler 272 into place. The female coupler is firmly attached to wall 273 by a nut 275 and washer 276.

The glass rod 270 is slidably mounted within the central bore of female optical coupler 271 and normally extends about halfway up the sleeve of the female coupler. Glass rod 270 may, if desired, be fused to the top of bent collimating lens 269 to form a single optical element. As usual all surfaces of the glass rod and the two collimating lenses except for associated optical windows and lens faces are made highly reflective to light. The collimating lens 269 is bent at a 90° angle and a 45° cut is made at the bend to form a 45° mirror 277. This bending of collimating lens 269 does not in any way change the properties of the lens other than to bend the direction the light travels by 90°. The bent collimating lens 269 is firmly glued or otherwise attached to a rectangular block 278. The rectangular block is made of metal or glass or the like and is made highly reflective to light on its front surface 279 and its top surface 280 (as indicated by the white dashed lines). The rectangular block 278 is glued or otherwise attached to a metal strike plate element 281. The strike plate provides a firm and balanced attachment means for one end of the spring 283. The spring 283 is in turn firmly anchored to a housing 284, in this case by a metal clamping bar 285 and two screws.

The lightpipe wall socket of FIG. 19 is shown with the male coupler 272 withdrawn from the female optical coupler 271. In this position the spring 283 pushes the bent collimating lens 269 and attached rectangular block 278 upwards to the fullest extent allowed by various mechanical stops (not shown). In this position the flat collimating lens 267 directly faces the reflective surface 279 on the front of the block 278 causing all the light leaving flat collimating lens 267 to reflect back on itself and return to the GG line. The light travelling between the lens 267 and the reflective surface 279 is enclosed on four sides by a rectangular mirror walled channel (not shown) which is fixed in place. Thus when a male optical coupler 272 is not plugged into the female optical coupler 271 light entering the GG line simply encounters a reflective surface and is returned as a backflow towards its source.

If the male coupler 272 is inserted into the female coupler 271, the mechanism does not respond until the male coupler reaches half way down the sleeve of the female coupler and touches the glass rod 270. To insure that the optical window 286 of the glass rod 270 is not damaged by contact with the male coupler the glass rod is provided with a small rim or ring 287 around its edge which makes physical contact with the edge of the male coupler.

As the male optical coupler 272 is inserted further into the female optical coupler 271 the glass rod 270, bent collimating lens 269 and rectangular block 278 push against the spring 283. At the point of full insertion, a threaded cap such as cap 42 of FIG. 3 must be placed over male optical coupler 272 and threaded onto threaded sleeve 274 of the female optical coupler 271 or the spring 283 will push the male optical coupler back out of the female optical coupler as soon as the user lets go with his hand. This serves as a safety feature by reducing the risk of pushing foreign objects into the female optical coupler 271.

Once the male optical coupler is in place the bent collimating lens 269 has been pushed downward so that lens face 268 is directly opposite the lens face 288 of the flat collimating lens 267. Light is then free to pass from the GG line through the two lenses and out the HH line. This design for a wall socket, therefore, only allows light to pass out of the socket when a male coupler is fully inserted and a threaded cap is screwed in place.

FIG. 20 illustrates an arrangement whereby the intensity of light passing through a lightpipe device can be measured without using a beam splitter or Pellicle mirror to remove a percentage of the light from the beam for measurement purposes. In FIG. 20, flat collimating lenses 290 and 291 face one another across a chamber 292. The two sides of the chamber 292 lying in parallel planes respectively above and below the plane of FIG. 20 are enclosed in flat mirrors (not shown), while the chamber walls lying in planes perpendicular to the plane of FIG. 20 are covered with a series of photo detectors 293, 294, 295 and 296, such as solar cells.

Two light rays are shown entering the metering device from line II on the left. The light is collimated by lens 290, passes across the chamber 292, and then strikes lens 291 where most of the light is transmitted to line JJ. A fraction of the light, however, is reflected off of the face 297 of lens 291 and travels toward photo detectors 293 and 296, as shown. Likewise, a small fraction of the light travelling from line JJ toward line II will be reflected from the face of lens 290 and detected by photo detectors 294 and 295. The light intensity measured by detectors 293 and 296 is directly proportional to the light flow emerging from line II and the light intensity measured by the detectors 294 and 295 is directional proportional to the light flow emerging from HH. This metering arrangement is therefore able to measure both the forward flow and and backflow through a lightpipe line using only the light that would normally be wasted by reflection. This method can be applied even if the lens faces of the collimating lenses have been given an antireflection coating, for even very good coatings will reflect some light around the edges of the lens where the surface of the lens is no longer perpendicular to incoming parallel light rays.

Many variations of lightpipe switches are also possible. The moveable element of the linear switch may be moved directly by hand by means of a knob or knob and wire arrangement. It could be moved by a solenoid, an hydraulic cylinder, a push/pull rod, a ratchet mechanism, or any number of other standard mechanical mechanisms. Likewise, the rotatable element of the circular switch of FIG. 18 may be rotated by a gear and ratchet mechanism, a thumb wheel mechanism, a cog and wheel arrangement, a step motor means, or any number of other possible standard mechanical mechanisms. The distance between adjacent optical channels in the fixed supporting structures of the linear or circular switches may be reduced to nothing so that light is never reflected as a backflow to the input lines, or it may be increased by any amount desired. Using suitable geometric modifications either full-bodied or flat collimating lenses may be used with either the linear or circular switch. The input collimating lens and 45° mirror 252 discussed in connection with FIG. 18 can be replaced by a bent collimating lens such as 269 in FIG. 19, which is free to rotate with the moveable element.

The moveable element of the lightpipe switch may have one or more channels that switch the flow of light between successive pairs of output lines and may additionally have one or more main input lines. A number of circular switches may be stacked to form a complex drum switch. Linear switches may also be stacked to form a flat complex switching grid. A simple or complex spiral switch is possible whereby the moveable element both rotates and moves linearly either simultaneously or in independent motion. A spiral type of lightpipe switch can be constructed to provide a random access between input lines so that the main line can be switched from one input line to another input line without sending light to any of the remaining input lines during the process of switching. A complex lightpipe switch may have plural moveable elements which move independently of one another or they may be coupled to move together in a prearranged pattern. The functions of a lightpipe switch may also be combined with those of a lightpipe divider.

Some elements of the lightpipe wall socket may be changed from the preferred embodiment. The female coupler means may need not be screwed to the housing; it may instead be riveted in place, glued in place, or otherwise attached to the wall of its junction box housing. With suitable changes in geometry full-bodied collimating lenses could be used in place of the flat collimating lenses of FIG. 19. The use of full-bodied collimating lenses would make possible the elimination of the enclosing rectangular light guide between the pair of lenses; stray light could be salvaged by the use of appropriate mirrors. The rectangular block 278 and the strike plate 281 may be made as a single component. The spring 283 may be positioned differently, it may have a different shape, or it may be replaced by pull strings or repelling magnets. The bent collimating lens 269, block 278 and strike plate 281 would typically be restrained to move along a track or guide bars. Other mechanical means of restraining the motion of the bent collimating lens, block and strike plate may also be used such as a hydraulic positioning mechanism. The block 278 may be replaced by a clear flat piece of glass or an open space with supports along the sides to space the bent collimating lens 269 above the strike plate 281. Another flat collimating lens would be positioned on the other side of strike plate 281 to face flat collimating lens 267. This additional lens would be used to send light into a different output line when the lightpipe socket is not in use. Geometry could be arranged so that some light always passes into this second output line.

The lightpipe wall socket device may be combined with other lightpipe devices. For example, one useful variation would be to include another output line that remained within the wall to continue the main light carrying line to another wall socket means. Light not used by one wall socket is sent to the next. Such complex wall sockets may include lightpipe dividers, diodes, and merges within a single junction box housing. The wall socket may have more than one mechanism, including more than one female optical coupler, so that more than one lightpipe fixture may be attached thereto.

The exact geometry or placement of photo detectors in the lightpipe metering device of FIG. 20 is not critical to the invention. The angle at which the photo detectors face the reflected light may vary widely depending on the properties of the photo detectors. Instead of placing the detectors off at an angle to the side, flat detector elements may be mounted on a thin baffle which is placed midway between the two flat collimating lenses. The thin baffle would contain a center hole for the main flow of collimated light to pass through unobstructed. Light intensity measurement may be accomplished with full-bodied or flat collimating lens systems, or between thin lens collimating pairs. The photo detectors need not be used to intercept all available reflected light. For example, the two detectors 295 and 296 may be eliminated; the remaining detectors 293 and 294 can still make the necessary measurement provided that there is enough available light for the detectors to respond.

Lightpipe diodes and lightpipe merge devices are conceptually similar and are therefore grouped together in this disclosure. A lightpipe diode functions to allow light to flow in only one direction in a lightpipe line. Any light reaching the lightpipe diode from the wrong direction, i.e., any backflow, will be reflected back on itself, just as if it had encountered a flat mirror. Light travelling in the forward direction continues through the lightpipe diode with little or no obstruction. The diode is useful in lightpipe circutis and networks wherever it is desired to eliminate the backflow and to cause light instead to flow only in the forward direction. One obvious place to position such a device is near the beginning of a lightpipe circuit immediately following the light source, since it is not usually desirable to return backflow light to a light source.

A lightpipe merge device simply serves to add light from some source to the middle of a main line in the forward direction only. Backflow light in the main line is not permitted to enter the merged line. Thus a merge behaves somewhat like a diode in that it allows light to be input to a main line but not output. Lightpipe merges are useful wherever it is desired to add a supplementary light source flow to a main flow. For example, if the main flow emerges from solar collection panels it may be desired to merge in an artificial light source flow somewhere along the circuit to provide light when the sun is not shining.

It is difficult to merge two beams of collimated light without increasing the divergence thereof or without causing a substantial backflow. The devices of this disclosure therefore merge the light inside optical mixer devices which do not increase the divergence and can be designed with very small backflows.

There are combinations of optical devices which could be used to simulate the operation of a diode. For example, two simple lightpipe merge devices can be arranged to feed inputs to one another in a manner such that the combination operates as a simple lightpipe diode. On the other hand, two lightpipe diodes and a Y-divider can be combined to operate as a simple lightpipe merge device. However, combination devices will generally waste light as compared to simple optical devices since each separate optical element adds on its own optical losses as well as adding to the cost.

A simple lightpipe diode is shown in FIG. 21 in which the forward flow of light is from line KK to line LL. Light travelling in the reverse direction, from the LL line, emerges from the male optical coupler 300 and enters an optical mixer 301 via optical window 302. The optical mixer is a glass rod of circular cross-section having a highly reflective coating around its cylindrical walls as indicated by dashed white lines 303. The light traverses the mixer and strikes the left face which is a flat mirror 304. The light is reflected off the mirror 304, passes through the optical window 302, and returns as a backflow into the male optical coupler 300 of line LL.

Light from the KK line emerges from the male optical coupler 305 and enters the optical window 306 of a full-bodied collimating lens 307 where the light is collimated into a parallel beam. The collimated light beam next strikes a plano-convex lens 308 which focuses the light onto a tapered glass rod 309. The light enters the comparatively wide mouth 310 of the tapered glass rod and is funneled between internally reflective sides 311 to an optical window 312. Optical window 312 is in turn fused to the end of the optical mixer 301. Light from line KK enters the optical mixer 301 and expands to fill the volume thereof, reaching the optical window 302 uniformly distributed across the optical mixer cross-section. The light then enters the male coupler 300 together with any backflow light that may be present and proceeds up the LL line.

It can be observed that some light emerging from LL passes through the optical mixer and into the optical window 312 where it then proceeds through the rest of optics and into the KK line. This undesirable leakage of light from LL to KK represents an inefficiency; an ideal diode would have no net flow from LL to KK. The fact that all optical paths must be reversible renders it impossible to make a perfect optical diode without leakage. The ratio of the area of the optical window 312 to the crosssectional area of optical mixer 301 is proportional to the percentage of light lost by backflow leakage. Although this percentage of leakage can never be reduced to zero, it can be made arbitrarily small by making the tapered rod very small at the point where it is fixed to the mixer.

The wide mouth 310 of the tapered glass rod 309 is given a flare to help funnel in possible stray light. Generally the flared end of the tapered rod 309 is made much larger than the light beam at this point so that the exact shape of the flare is not critical.

All tapered glass rods such as 309 increase the angular divergence of light passing through them to compensate for this effect the lens system 307 and 308 taken together must first decrease the angular divergence of the light beam KK before sending it into the tapered rod 309. By proper choice of design parameters the light entering the mixer from KK can be given an angular divergence equal to or less than the angular divergence it had while in the KK line.

The two male couplers 300 and 305 both plug into female coupler means (not shown in FIG. 21). The entire diode is housed in a junction box housing.

The simple lightpipe merge device of FIG. 22 has many elements in common with the diode of FIG. 21. Here the main line flow is through the MM/NN line, where the forward flow is from MM to NN. The PP line is the merging branch line. Light travelling down the MM line passes through the male optical coupler 321 and directly into the optical mixer 322 where it reflects off mirrored surfaces 323 and emerges at the far end to enter the male optical coupler 320 of the NN line. Backflow from NN to MM exactly follows the reverse path.

Light from branch line PP emerges from male optical coupler 324 and passes directly into a full-bodied collimating lens 325. The collimated light beam next strikes a plano-convex lens 326 which focuses the light onto the optical window 327 of the tapered glass rod 328. Tapered glass rod 328 is also covered with a mirrored surface 329 for internally reflecting light. The narrow end of the tapered glass rod enters the side of the optical mixer 322 at a shallow angle and allows light to exit through optical window 330. The portion of the glass rod 328 which enters the optical mixer is made to occupy a minimum cross-sectional area inside the mixer while being angled so that its optical window 330 is parallel to the optical windows 331 and 332 at the ends of the optical mixer. The parameters are arranged so that the light beam emerging from optical window 330 is exactly aimed toward optical window 332 so that there is no increase in its angular divergence. The tapered glass rod 328 is shown bent into an "S" shape. The exact curvature of the glass rod is not important and is arranged in whatever manner is convenient for the placement of the PP line. The curvature of the tapered glass rod must, however, be gradual so that additional increases in the divergence of the light do not result.

It should be noted that some backflow light from NN to MM may enter the optical window 330 and thus become a source of optical leakage. Again, the ratio of the area of the optical window 330 divided by the cross-sectional area of the optical mixer 322 is proportional to the percentage of backflow leakage. There is also some loss due to light striking the portion of the tapered glass rod 329 within the optical mixer 322, but the back side of the tapered glass rod can be provided with a flat mirror 333 to reflect light back into the MM line. This MM backflow is proportional to the same ratio of areas used to calculate the leakage through optical window 330. This leakage and backflow can be made arbitrarily small by reducing the size of the portion of tapered glass rod which protrudes into the optical mixer 322.

The use of solid glass elements in the devices of FIGS. 21 and 22 somewhat limit their application at higher intensities of light where such elements will begin heating and may become damaged. Also the optical mixer is limited to the diameter of the male coupler so that there is a practical lower limit on the percentage of leakage and backflow losses depending on how small the narrow end of the tapered glass rod element can be made. These limitations can be overcome by making the optical mixer elements out of hollow chambers having reflective interior surfaces. These chambers have light input to them by lens systems and so are not limited in size by the diameter of the male coupler.

Forward travelling light passes through the lightpipe diode of FIG. 23 from line QQ through collimating lens 340, plano-convex lens 341, optical mixer 342, plano-convex lens 343, and collimating lens 344 into line RR. Light travelling in the reverse direction from line RR passes into lenses 344, 343, travels into the optical mixer 342 and strikes reflective portion 345 of mirrored surface 346, whereupon the direction of travel of the light is reversed and the light is reflected back through the mixer 342 and lenses 343 and 344 as a backflow. The lenses 340 and 341 focus light from the QQ line onto a small optical window 347, which is simply a circular hole leading into the optical mixer 342. The wide opening, on the right side of optical mixer 342 forms the optical window 348 on that side of the mixer. Flared collars 349 and 350, respectively, function as misalignment mirrors at each optical window. Lenses 340 and 341 are designed to focus the image received at optical window 251 of lens 340 onto the optical window 347 in a reduced size that is exactly equal in diameter to the optical window 347. On the right the lenses 343 and 344 focus an image received at the optical window 252 of lens 344 onto the optical window 348 as a magnified image that is exactly equal in diameter to the optical window 348. Light lost to leakage in FIG. 23 is proportional to the ratio of the area of optical window 347 to the area of optical window 348. By arranging for the window 348 to be several times larger than window 352, and by designing the lenses 340, 341 to form a very small image at optical window 347, the light lost to leakage can be kept to one percent or less.

A high intensity lightpipe merge device is depicted in FIG. 24. The main flow occurs between the SS and TT lines while light is merged into the main flow from the UU line. Light travelling in the forward direction originates in the SS line, passes through lens system 360 and is magnified and focused onto optical window 361 of optical mixer 362. Light then exits from optical mixer 362 by way of optical window 363 and is brought to focus by lens system 364 onto the TT line. Light travelling in the reverse direction exactly reverses this sequence from TT to SS, with the light from TT being magnified and focused by lens system 364 onto optical window 363. Light originating in the auxiliary line UU is focused by lens system 365 onto or very near the 45° angled mirror 366, which serves to deflect the light onto the mixer chamber 361. The angled mirror 366 has a triangular cross-section with all three sides given a reflective finish. Light striking the back of this angled mirror from the SS line is reflected back on itself into the SS line as a backflow. Backflow and leakage losses for this arrangement are proportional to the ratio of area shadowed by the angled mirror 366 to the area of the optical windows 361 or 363.

An alternate position of the angled mirror 366 is illustrated by the dashed triangle 367. A hole 368 is cut in the side of the optical mixer to allow light from the lens system 365 to reach the mirror. This version may have some geometric advantages but it also somewhat increases the light losses since light may leave the chamber 362 by striking the hole 368.

Another alternate method of arranging for merging light to enter an optical mixer is illustrated in FIG. 25. Here the main forward flow of light is from VV to XX and the auxiliary light enters from the YY line. Light coming from VV passes through collimating lens 380 which collimates the light and lens 381 which focuses the light onto the optical window 382 leading into the optical mixer 383. A thin prism 384 is used to bend the angle at which the collimating light approaches the optical mixer. This arrangement gives the YY beam of light direct access to the front of the lens/prism assembly 381, 384 and the optical window 382. The approaching YY beam is brought to a focus by a lens system (not shown) and sent directly into the optical mixer through a hole 385 in the lens/prism. The hole 385 is given reflective walls so that VV or XX light striking this surface inside the lens/prism assembly will in part be salvaged. If the YY lens system is focused on the nearest opening of the hole 385, the mirror lined hole becomes in effect a small optical mixer 383. The use of this lens/prism/hole arrangement will increase the dispersion of the light passing through the prism which in turn will cause slight increases in the overall divergence of the light. However, it reduces the backflow and leakage losses over those experienced by the device of FIG. 24, inasmuch as backflow and leakage losses in FIG. 25 are a function of the ratio of the area of the hole 385 to the cross-sectional area of the lens/prism assembly 381, 384. The advantage is that the useful area of the lens/prism assembly is much larger than the area of the optical window 382, while the size of the hole 385 need not be larger than the angled mirror 366 of FIG. 24. This advantage can be used to reduce the leakage losses or to reduce the overall size of the merge device.

The lightpipe diode and merge devices may be extended to include several variations. The lens systems which supply and recover light to the optical mixer elements may include full-bodied or flat collimating lenses or they may only have a number of ordinary thin lenses. They may have only one lens element or any number of lenses. The light path through the lens systems may be bent at any desired point by means of mirrors or prisms (as was done in FIG. 26, for example). Appropriately shaped plastic elements or hollow reflective chambers, can be substituted for the tapered glass rods and optical mixers. Both the tapered rod and optical mixer may be bent along their length or they may include mirrors or prisms placed along their length to bend the light flow. In addition, the tapered rod and optical mixer may have any reasonable cross-section, and/or their cross-section may gradually change along its length.

The optical mixer is shown to be a cylinder with at least one end serving as an optical window. However, other shapes can be used. For example, a large mirror-lined rectangular box shape may be ued with a large circular hole on one face and small circular hole on the opposite face serving as optical windows. Generally a cylindrical optical mixer may have any length, although it should be equal to several times its diameter or more. However, in one special case the length of the optical mixer can be reduced to zero. In FIG. 21, the body of the optical mixer 302 can be eliminated entirely so that the mirror 304 ends up flat against the male coupler 300.

This is possible so long as the male coupler includes its own optical mixer element as it does in FIG. 1.

The optical mixer and glass rod elements may include cooling fins or other heat dissipation means. Generally, lightpipe diodes and merges have female coupler for attachment of all external lines and are housed in junction box housings either alone or in combination with other lightpipe and electronic devices. The optical diodes may have more than one forward flow line and the optical merge devices may have more than one incoming merge line. Lightpipe dividers may be combined with the diode and merge devices to provide additional combinations of input and output lines.

The purpose of a lightpipe dissipater is to completely dissipate any light that enters it. In systems dealing with low intensity light, unwanted light can be allowed to simply strike any black metal surface or even allowed to simply escape into the air. However, in high intensity lightpipe networks removing unwanted light containing hundreds or thousands of watts of energy can be a safety problem. Black surfaces may melt or otherwise be damaged by such intensities of light or they may cause burns if accidentally touched. Removing light by simply allowing the end of a lightpipe to aim skyward may pose a hazard to birds, low flying aircraft, nearby workers, and any object that accidentally cuts across such an intense beam of light.

It often proves necessary to shunt the full intensity of a light carrying lightpipe into some sort of dissipater. For example, a building may have an installed lightpipe network which distributes light collected from solar panels on the roof to various lighting fixtures located throughout the building. It may often be the case that most of the lighting fixtures are turned off so that the extra light is sent back into the network. If this excess light is not eliminated from the system it will go into heating up the various optical devices in the network which may result in damage or destruction to these devices. Therefore the excess light must be dissipated. Optical dissipaters are also useful as safety devices in lightpipe networks. At various critical points in such networks special devices test for sudden loss of return energy which signals the break of a lightpipe trunk line. Should this occur the safety device channels all of the light energy into an optical dissipater, thus preventing excessive damage to objects in the area surrounding the break in the lightpipe. Optical dissipaters may also allow workmen to repair or install devices in a lightpipe network by removing light energy that would otherwise reach the section being worked on without having to turn off the entire network. Lastly, optical dissipaters may be used to test whole lightpipe networks since they serve to simulate a "load" on the system in much the same way as a resistor may simulate a load in an electrical circuit.

The purpose of a lightpipe terminator is to return all light that attempts to enter a device back down the lightpipe toward the light source. Such devices employ mirrors connected to male or female couplers which return all the light reaching them into the lightpipe for use elsewhere in the lightpipe network. For example, consider a lightpipe network installed throughout a building. Lightpipe dividers having more branch lines than are needed at the time of installation may be provided at various places in the network so that additional lightpipe circuits may be added at those places at some future time. The unused ports of the divider junction box are female couplers which would each be mated with a male lightpipe terminator. The terminators each cause a backflow of light in the main line which in turn is usually returned to a forward flow by a diode somewhere in the line. Likewise any lengths of lightpipe which are connected to an active circuit at one end but have nothing but a male coupler at the other end may be coupled with a female lightpipe terminator.

FIG. 26 depicts a lightpipe dissipater which consists of a large iron or steel chamber 390 which is for the most part buried in the ground 391 or in a block of concrete which is in turn buried in the ground. The chamber 390 is sealed on the top by the top end cap 392 and sealed on the bottom by the bottom end cap 393 which are both threaded in place. Light travelling down the lightpipe 394 passes through an optical coupling means 395 and enters the chamber of the dissipater as shown by the representative light rays. The light is absorbed by the metal walls of the chamber and converted into heat which is passed into the surrounding soil or concrete. The chamber is made large enough to dissipate the maximum anticipated light intensity while maintaining a skin temperature less than the boiling point of water. This temperature restriction is necessary in order to prevent the water in the surrounding soil from turning into steam and possibly causing an explosive force to develop.

The interior walls of the chamber are finished so as to be moderately reflective to light. For example, walls that reflect 50 to 80 percent of the light striking them would be desirable. A coating of heat resistant white or silver paint, or a metal plating, would be sufficient to accomplish this purpose. No special care is taken to make the interior walls optically smooth, in fact, a slightly roughened surface may be desirable. Rough and reflective walls cause the light to undergo multiple reflections before being absorbed. This causes a more uniform absorption of light within the chamber and therefore a more even heating of the walls.

Special measures are taken around the two end caps. The inside surface of the top end cap 392 is made highly reflective to light so that less light is absorbed by the top end cap, and it is therefore not heated as much as the rest of the chamber. This prevents the lightpipe coupling means 395 from becoming excessively hot and being damaged. The interior of the bottom end cap 393 and nearby portions of the chamber may be given a somewhat less reflective coating as indicated by the shading. This causes this region to absorb more light and thus become hotter. Since the chamber is buried in the ground, this heat is dissipated deep underground where it can be absorbed without harm. However, the bottom end cap is usually not given a black surface or it may become hot enough to turn surrounding moisture into dangerous steam.

The optical coupler means 395 is the simplest type since there is no backflow. The male optical coupler is a simple type having cut and polished optical fibers which extend to the tip of the male coupler to form an optical output window. The female coupler is similar to that of FIG. 2 without the misalignment mirrors. The entire optical coupler means is sealed against the passage of moisture. A very small vent hole 396 is drilled in the top cap at an angle to prevent water from running in. This vent hole allows air to escape as it heats up and expands.

A female lightpipe terminator 400 is illustrated in FIG. 27. Here a male optical coupler 401 is shown inserted in a sleeve 402 extending downwardly from a terminator chamber 403. A floating cap 404 containing a flat mirror 405, a spring 406 and a bearing strike plate 407 for the spring are all mounted to the top of chamber 403. The floating cap 404 also includes a number of clips 408 which press against the male optical coupler 401. The outside of the terminator is provided with cooling fins 409.

As the male optical coupler 401 is pushed into the sleeve 402, it is directed into the mouth of the cap 404 where the clips 408 center the cap onto the male coupler. The spring 406 provides the force to gently push the cap onto the male optical coupler until the male optical coupler directly abuts the flat mirror 405. If the mirror 405 were not free to rotate, it could become scratched as the male optical coupler is twisted during insertion. This problem is avoided by making the floating cap 404 free to rotate with the male coupler as it is inserted. The spring and bearing strike plate 407 are also free to rotate so that there is little resistance to keep the cap 404 from rotating. The spring clips 408 insure that the cap is firmly clamped to the male optical coupler.

Light leaving the male optical coupler 401 immediately strikes the mirror 405 and is returned into the lightpipe with a minimum of optical losses. Typically the mirror would consist of a layer of aluminum overcoated with a one-half wave thickness of silicon monoxide. A small rim may be placed around the mirror to prevent the face of the male coupler from coming into direct contact with the mirror and causing scratches from dirt. The spring and cap mechanism would still serve to insure a minimum wear of the rim and a good alignment of the mirror and shaft.

FIG. 28 illustrates a male lightpipe terminator 410 which can be inserted into the female optical coupler of some optical device to prevent the escape and loss of light intensity. The device consists of a solid shaft of metal 411 which has the exact dimensions of a male optical coupler and also includes a threaded cap 412. The front face 413 of the terminator is a flat highly reflective mirror. The back of the shaft is encircled by a number of small cooling fins arranged so that the back portion also serves as a knob which can be used to grip the shaft while attaching or removing the device.

A wide number of variations are possible in the design of a lightpipe dissipater. The main chamber may be of any size or shape. It could have a large drum shape; it could be rectangular, spherical, or complex, or irregular in shape. The end caps may be screwed in place, welded in place, or otherwise attached. The chamber may be made of iron, steel, aluminum, or any other metal. In some cases, the chamber may be made of glass, fire brick, or other non-metalic substance. It may include brackets, flanges, cooling fins or other protrusions. It may be buried in sand, gravel, soil, concrete, or other suitable substance. It may be submerged in water or be mounted so that it is mostly surrounded by air. The chamber may be filled with dry air, special mixtures of gases, vacuum, or even water or some other liquid. The chamber may be filled with a transparent solid such as glass, so that the entire chamber is a large glass rod coated with light absorbing surfaces. The interior surfaces of the chamber may be painted white, silver, or any other color. They may be metal plated, plastic coated, glass coated, or given any other type of coating, or the walls may be left natural without a coating. The interior surface may be smooth, rough, or deformed in some special manner. Light baffles or mirrors may be added to the interior to absorb or redistribute the light. The lightpipe coupling means may be of the simple or complex type and may be mounted at any appropriate point around the main chamber. More than one coupling means may be attached to a single dissipater chamber. The coupling means may consist of simply running a lightpipe line into the chamber and firmly attaching it in place with glue, clamps, or other means without a detachable coupler. The vent hole may be eliminated or may include a valve mechanism to allow venting only when the pressure becomes high.

One useful variation of a lightpipe dissipater involves making the chamber out of a length of steel or aluminum tubing measuring perhaps four to six inches in diameter and from three to six feet in length. This dissipater would include cooling fins around the outside of the dissipater chamber and would be used in air. One version would be light enough to be carried to a field site by a workman. Other versions could be mounted on a pole, on the outside of a building, in a utility area, or the like. Generally the chamber and cooling fins would be made large enough so that a workman would not get burned by touching its exterior while it was being used. In some cases cooling fins may be added. Portable models may have handles for carrying it about and legs to stand on.

Two variations of a terminator are depicted in the drawing in which a female terminator is shown having a self-adjusting mirror arrangement and a male terminator is shown having a simple fixed mirror. It is also possible to design a female terminator with a simple fixed mirror and a male terminator with an adjustable mirror. An adjustable mirror male terminator would include a mirror mounted on a floating cap, a spring with bearing strike plate, and hold-in-place spring clips arranged in a suitable design that is comparable to the female terminator design of FIG. 27. Numerous variations of the mechanism used to orient and adjust the position of the mirror in a terminator is possible. They may include different arrangements of the elements shown here. They may include the use of thumb screw fine adjustments, pivot points, multiple use of springs, hydraulic cylinders, complex bearings, ball and socket joints, plastic parts, resilient foam plastic seals and springs, and many other possible mechanical elements and arrangements. The flat terminator mirror may be replaced by a slightly convex mirror which helps to keep light from leaking out from around the edges. The mirror element may be replaced by a corner reflector, a cube corner prism, or a cone mirror having a 90° apex angle. The mirror element means may be encircled by a small rim to prevent direct contact of the mirror means with the face of the mating optical coupler means. This rim may have the geometry of a small rectangle rotated around an axis at some distance from the axis. The side of the rectangle facing the axis may be cut at an angle or be given a curve. The rim would usually be given a reflective surface on all portions that may be struck by the light flow.

A lightpipe terminator may have cooling fins as depicted in FIGS. 27 and 28 or the cooling fins may be eliminated if the wattage being absorbed is very small. The cooling fins may have any design, size or shape. Means may be provided to bring the floating cap 404 of FIG. 27 into better thermal contact with the surrounding housing such as attaching the floating cap to a ball and socket joint with spring where the socket joint would carry away heat directly to the housing. The solid metal shaft 411 of FIG. 28 may instead be made hollow.

The lightpipe control devices described herein, taken together, make possible the design of complete high intensity lightpipe networks. Lightpipe networks and their related control devices, of course, have already been manufactured and installed in the communications industries. However, lightpipe networks used for communications and those used for the distribution of high intensity light are very different from one another in design, function and use. Communications lightpipes carry low intensity laser light of one frequency over relatively long distances, while the lightpipe networks of this disclosure carry high intensity white light over relatively short distances. The lightpipe control devices used in communications are generally an order of magnitude smaller in physical size than those used in high intensity applications. Laser communication networks usually transmit less than a watt of power through their lines while hundreds or thousands of watts are typically carried in high intensity circuits, particularly those carrying solar light. Indeed, the roof of a factory may be used to collect light intensities in the range of a million optical watts, and such light intensity may be handled by the devices of this disclosure by suitable enlargement of scale, careful craftsmanship, and minor design modifications.

An infinite number of high intensity lightpipe networks or circuits are possible. For example, a high intensity lightpipe network could be extended over an entire city, whereby each home or building would supply light to the network during the day for conversion into electricity at some central plant. During the night the central plant would supply light to homes and buildings over the same network. A lightpipe network could also be confined to a single home or building. Solar light gathering panels can be used to collect both heat and light and distribute it to various devices in a building during the day. At night the same lightpipe network would be used to distribute heat and light generated by artificial sources. Hundreds of possible circuits may be used to accomplish this function. It is the purpose of this disclosure to demonstrate that such lightpipe circuits are possible and to illustrate some simple combinations that are likely to occur in practical circuits.

Figure 29:
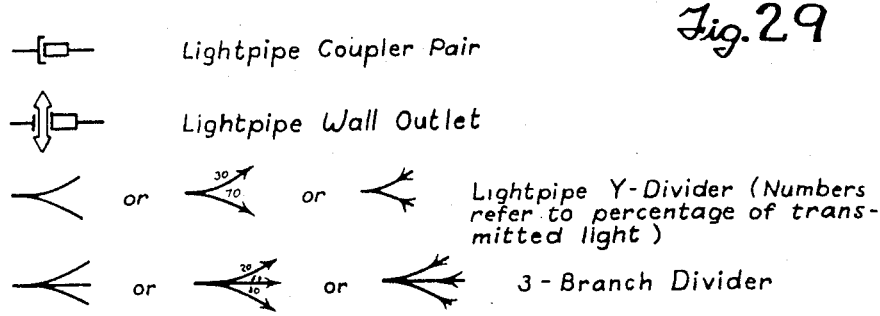
FIG. 29 is a table of symbols used to identify lightpipe devices in lightpipe circuit diagrams.
Figure 30:
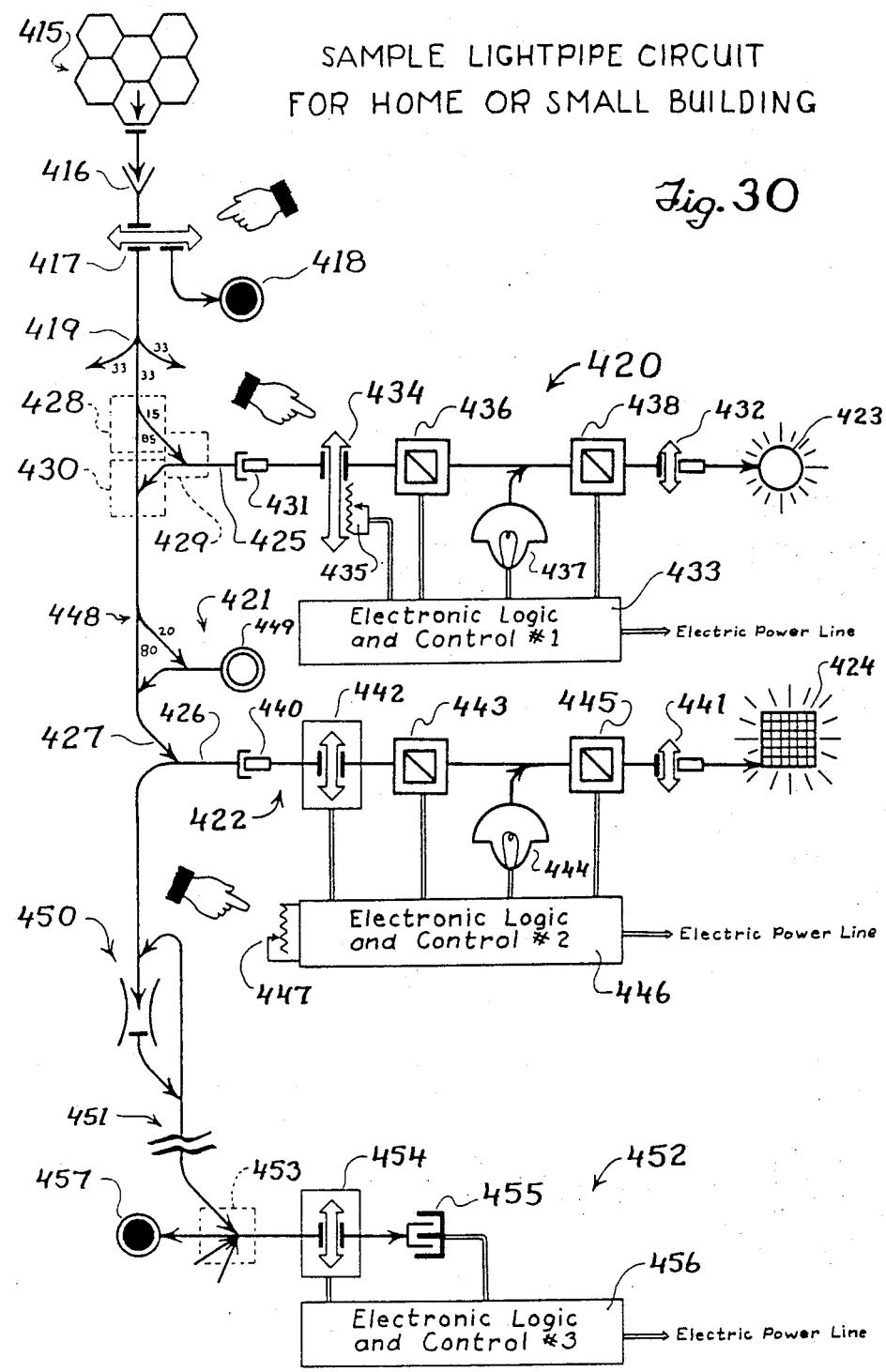
FIG. 30 presents a sample lightpipe circuit diagram for a home or small building.

FIG. 30 depicts one possible arrangement of lightpipe devices forming a complete lightpipe circuit as may be used in a home or small building. The symbols used in this lightpipe circuit diagram are presented in FIG. 29. The main line begins with a series of solar light collection panels 415 located on the roof of the building. The total input from the solar panels is gathered into a single lightpipe and immediately sent into a series of three components consisting of a diode 416, a two position switch 417, and a dissipater 418. The diode prevents any backflow light from reentering the solar panels. The hand operated switch allows a workman to switch all the energy of the solar panels into the dissipater so that the rest of the circuit can be worked on without having a dangerous flow of high intensity light to contend with. These three devices may be mounted on the roof of the building right beside the solar panels so that the solar energy feeds directly into them. From this point on, the main lightpipe line travels through a series of dividers and finally reaches the grouping of devices at the bottom of the page. In practice these lines and devices are installed in the walls of the building in the same fashion as electric wiring or plumbing. The main lightpipe line first encounters a 33/33/33 divider 419 which splits the main line into three smaller main lines each having one third of the intensity of the original line. From this point on, only the middle main line is shown; the other two lines travel to other circuits and devices similar to those shown for the center line.

Continuing down the line, the main line encounters three small lightpipe branch circuits 420, 421 and 422. Discussion of the dummy branch circuit 421 will be deferred until later. Branch circuits 420 and 422 are very analogous to the parallel and series circuits of electric wiring. The "parallel" branch circuit 420 is being used to illuminate a lightpipe bulb 423 while the "series" branch circuit 422 is shown illuminating a portion of light emitting fabric 424 such as disclosed in U.S. Pat. No. 4,234,907. The major difference between these two branch circuits is the manner in which the light enters from the main line. In the "parallel" or "fractional intensity tap" configuration of branch circuit 420, only 15% of the main flow is fed into the fractional intensity tap line 425 supplying branch circuit 420. In the "series" or "full intensity tap" configuration of branch circuit 422, all of the main flow is sent into the full intensity tap line 426 supplying branch circuit 422 and what is not used continues on its way by means of a lightpipe merge device 427. If the fractional intensity tap line 425 is broken or all the light diverted thereto is used, optical devices located further down the main line will still continue to receive operating light. If the full intensity tap line 426 is broken or uses all the light sent to it, however, all devices located further down the main line will receive no light. However, full intensity tap circuits use fewer lightpipe devices for their operation and are therefore less expensive to install.

The fractional tap intensity line 425 tap configuration uses a two branch divider 428 and two lightpipe merge devices 429, 430. A fraction of the main flow, in this case 15%, is split off from the main line by the two branch divider 428 and is then sent into an optical merge device 429 in the forward direction along the fractional intensity tap line 425. This first merge device 429 prevents back flow from the tap line from becoming backflow in the main line. The lower merge device 430 sends any backflow from the fractional intensity tap line back into the main line in the forward direction. Light travelling into the fractional intensity tap line 425 typically travels into a junction box (not shown) which houses all the elements between male-female optical coupler assembly 431 and the wall socket 432 including the electronic logic and control circuit 433. The junction box may in some cases also include the fractional intensity tap devices 428, 429 and 430. After passing through coupler assembly 431, light in fractional intensity tap line 425 encounters a hand operated valve mechanism 434 which includes a variable resistor 434 that informs the logic and control circuit 433 of the setting of the switch. The light next passes through a light intensity metering device 436 which tells the logic how much light is in fact being sent along the fractional intensity tap line from the solar panels. The logic and control circuit 433 then sends an electric current to an electric light bulb 437 to supply whatever light is lacking when, for example, a cloud passes in front of the sun. Another measurement is made of the light intensity at light intensity meter 438 to determine if the bulb is putting out sufficient light and to regulate it accordingly. The light then passes through the wall socket 432 and into the lightpipe lamp fixture 423. The light intensity meter 438 is needed in particular to determine if the light bulb 437 is working or is burned out. It also measures the backflow from the wall socket 432 to determine if the lamp is plugged in; if not, the logic and control circuit 433 will turn off the light bulb 437 regardless of the setting of optical valve mechanism 434. As shown, the electronic logic and control circuit 433 is connected to an outside source of electric power.

The full intensity tap line 426 receives light by way of a single lightpipe merge device 427 arranged so that full intensity of the main line is merged into the full intensity tap line in the forward direction. Backflow light from the full intensity tap line passes through the merge device 427 to then become the new main flow. As before, everything between the male-female optical coupler assembly 440 and the optical wall socket 441 is housed in a single junction box (not shown). The two light intensity metering devices 443 and 445 and the electric light bulb 444 are utilized by the electronic logic and control circuit 446 in much the same manner as with branch circuit 420. The principal difference is in the optical valve mechanism arrangement 442 and the variable resistance control 447. Here the valve 442 is controlled by the logic and control circuit 446 while the user indicates his desired light intensity by setting variable resistor 447. The logic and control circuit reads the resistance value and opens the valve 442 until the desired light intensity is reached as indicated by the meter 443. If not enough light is supplied even in the full open position of valve 442, then the electric light bulb 444 is turned on and its power is increased until the desired light intensity is reached. As before, the logic and control circuit 446 also monitors if the light bulb is burned out or if the light curtain 424 is plugged into the wall socket.

The dummy branch circuit 421 includes an 80/20 fractional intensity tap 448 which ends in a terminator 449. Circuits such as this may be placed anywhere along a main line during installation of the lightpipe network to reserve a place along the line where a future branch circuit may be added. A dummy branch circuit may also be made using a full intensity tap and terminator. Dummy circuits of this type are important in lightpipe networks since lightpipes cannot be spliced at field sites.

The branch circuit 450 is used to decrease the divergence of the light in the main line and also to stop the backflow and send it back in the forward direction. This circuit may be usefully employed anywhere along a main line to salvage backflow light. By decreasing the angular divergence light loss in the various lightpipe devices is greatly diminished. The cut at 451 simply indicates that more circuits and devices may be placed along the main line than the few shown here.

The main line ends with the circuit at 452, where all the main lines in a lightpipe network are brought together by the multiple merge device 453 and sent through the electrically controlled valve 454 and into a light to electricity converter 455 such as the light to electricity converter disclosed in my co-pending U.S. patent application Ser. No. 178,784, filed Aug. 18, 1980. Light to electricity converter 455 contains a matrix of solar cells which converts the light reaching them into electricity. This electricity is sent into the an electronic logic and control circuit 456 which uses it to charge up a bank of storage batteries (not shown). If the batteries become fully charged, the logic 456 closes the valve 454 which effectively shunts the light into a lightpipe dissipater 457.

In the sample lightpipe circuit of FIG. 30, light from the source is simply sent along a number of main lines in the forward direction only, until at the end the unused light is converted to electricity or disposed of by a dissipater. Many other strategies are possible. The main lines may be formed into large loops that feed back on themselves by means of lightpipe merges. Long straight main lines may end in smaller loops, or they may be ended by a terminator which sends all the unused light back toward the source as a backflow. Strategies which make better use of the backflow are possible.

Limitless variations both in function and in design of logic and control circuit devices are possible for the control of lightpipe circuits. Those logic circuits may be powered through conventional house wiring, or by batteries, or by using light to electricity converters to obtain power directly from the lightpipe network. The logic devices may include alarms and indicators for various conditions such as burned out light bulbs. They may vary the light intensity according to the time of day, giving more light during daylight hours for example. With suitable attachments, they may vary the color of the light or even the "color temperature" (a term used in photography) of the light. Many button controlled settings are possible, including timers and settings that give only solar light or only artificial light. The exact electronics and logic of such devices is not part of this disclosure.

As increasing numbers of lightpipe circuits are drawn up, some lightpipe devices appear over and over again in the same combinations. It then becomes desirable to combine these devices into a single lightpipe device to save materials and cost and to increase their light transmitting efficiency. The fractional intensity tap circuits 420 and 421 utilize a two-way branch divider and two merge devices which would typically be combined and manufactured as a single device. Likewise, the switches and logic control circuits such as the elements between male-female optical coupler assembly 431 and lightpipe wall socket 432 would also be combined into such combination devices and housed in single junction boxes.

Several embodiments of the present invention have been specifically shown and described herein. It is understood as well that additional changes and modifications to the form and detail of the lightpipe distribution network and various lightpipe distribution devices illustrated above may be made by those skilled in the art without departing from the scope and spirit of the present invention. It is thus the intention of the inventor to be limited only by the following claims.

I claim:

1. In combination, a lightpipe and optical coupler assembly for terminating said lightpipe comprising a plurality of optical fibers each having an optical core section with an optical index of refraction, said optical fibers forming said lightpipe, and a coupler assembly connected to one end of said lightpipe, said coupler assembly including a body having a hollow inner sleeve structure for receiving one end of said optical fibers, the end of said optical fibers within said inner sleeve structure being fused into a single rod, and a hollow shaft section extending coaxially from said inner sleeve structure, said hollow shaft section including optical mixing means mounted therein for receiving light from the fused end of said optical fibers, said optical mixing means having an index of refraction which is substantially equal to the index of refraction of the optical core section of said optical fibers.

2. The lightpipe and optical core assembly of claim 1 wherein said optical fibers within said hollow inner sleeve structure extend from said fused end thereof into a tightly packed, unitary bundle, the body of said coupler assembly including heat dissipating means formed on the outer surface thereof around said tightly packed unitary bundle.

3. The lightpipe and optical coupler assembly as set forth in claim 1 wherein said plurality of optical fibers are formed into a plurality of optical fiber bundles surrounded by a layer of metal sheathing, and wherein said optical coupler assembly body also includes a hollow outer sleeve structure which surrounds at least a portion of said hollow inner sleeve structure to define a cavity therebetween having a volume sufficient to receive the metal sheathing of the lightpipe bundles, said metal sheathing being separated from the exterior of one end of said lightpipe bundles and inserted in said cavity while the end of said lightpipe bundles from which said metal sheathing is removed is received in said hollow inner sleeve.

4. An optical couper apparatus as set forth in claim 3, wherein the outer surface of said portion of said hollow inner sleeve structure surrounded by said hollow outer sleeve is serrated to provide a surface for gripping the metal sheathing.

5. An optical coupler apparatus as set forth in claim 3, wherein a plurality of cooling fins are formed around the outer periphery of said hollow outer sleeve structure.

6. A lightpipe merge device for merging light travelling through a branch lightpipe line with light travelling from a first segment in a main trunk lightpipe line to a second segment in the main trunk lightpipe line, said lightpipe merge device comprising an optical mixing means connected between the first and second segments of the main trunk lightpipe line for transmitting light therebetween, said optical mixing means having a first optical window in optical communication with the first segment of the main trunk lightpipe line and a second optical window in optical communication with the second segment of the main trunk lightpipe line, and an optical merge means for transmitting light from the branch lightpipe line to the interior of said optical mixing means, said optical merge means including a tapered rod means having a first end section which projects into said optical mixing means at an angle such that the angular divergence of light entering the interior of said optical mixing means from said tapered rod means does not increase relative to the light transmitted between the first and second segments of the main trunk lightpipe line, said first end section of said tapered rod means terminating in a third optical window oriented in substantially parallel fashion with respect to said first and second optical windows, said tapered rod means including a fourth optical window of greater cross sectional area than said third optical window and a body tapering inwardly from said forth to said third optical window.

7. A lightpipe divider apparatus for receiving light from a main trunk lightpipe line and for distributing the light so received among a plurality of branch lightpipe lines, said lightpipe divider apparatus comprising:

(a) a housing structure having a cavity formed therein;

(b) a first collimating lens means mounted within said cavity for receiving light from the main trunk lightpipe line and for directing light so received toward one end of said cavity in the form of a parallel light beam, said collimating lens means including a stem having an optical window means positioned adjacent said main trunk lightpipe line to permit the entry of light into said first collimating lens means, a curved lens face spaced from said optical window means, and a lens body which flares outwardly from said stem and extends to said curved lens face;

(c) reflecting means positioned within said cavity for receiving said parallel light beam and for respectively redirecting portions of said parallel light beam toward the plurality of branch lightpipe lines; and (d) a plurality of additional collimating lens means mounted within said cavity for respectively receiving said portions of said parallel light beam and for respectively focusing said portions so received into the plurality of branch lines, each said additional collimating lens means including a stem having an optical window means positioned adjacent to one of said plurality of branch lightpipe lines, a curved lens face spaced from said optical window means, and a lens body which flares outwardly from said stem and extends between said stem and said curved lens face.

8. A lightpipe divider apparatus as set forth in claim 7, wherein said reflecting means includes a plurality of mirror means fixed to said one end of said cavity at angular orientations with respect to the direction of travel of said parallel light beam for receiving at least some of said portions of said parallel light beam from said first collimating lens means.

9. A lightpipe divider apparatus as set forth in claim 8, wherein said reflecting means also includes a triangular mirror means positioned in spaced relationship from said mirror means to receive and redirect an additional portion of said parallel light beam from said first collimating lens means toward at least one of said plurality of additional collimating lens means.

10. A lightpipe divider apparatus as set forth in claim 9, wherein said mirror means and said triangular mirror means are arranged in split pairs respectively associated with each of the branch lightpipe lines such that each split pair receives an equal portion of high intensity light travelling along the center of said parallel light beam and redirects said equal portion of high intensity light toward the branch lightpipe line associated therewith.

11. A lightpipe dividing apparatus as set forth in claim 10, wherein all of said plurality of mirror means and said triangular mirror means are formed in a single piece of optical grade material which is mounted at said one end of said cavity.

12. A light pipe switch device for use in directing substantially all light from a main trunk lightpipe line to any selected one of a plurality of branch lightpipe lines in a lightpipe network, said lightpipe switch device comprising:

(a) a first supporting structure having a plurality of optical output channels formed therein to communicate respectively with associated branch lightpipe lines in the plurality of branch lightpipe lines;

(b) a plurality of output lens means respectively disposed within said plurality of optical output channels to focus light respectively into the associated branch lightpipe lines;

(c) a second supporting structure mounted for movement relative to said first supporting structure, said second supporting structure having an optical input channel means formed therein to align with a selected one of said plurality of optical output channels in response to the movement of said second supporting structure relative to said first supporting structure; and (d) optical means within said optical input channel for receiving light from the main trunk lightpipe line and for redirecting substantially all light so received through said selected one of said plurality of optical output channels and into the individual output lens means associated therewith, said optical means including reflecting means mounted in fixed position within said optical input channel and an input lens means mounted inside said optical input channel in fixed position relative to said first supporting structure for collimating and directing light from the main trunk lightpipe line toward said reflecting means mounted within said optical input channel.

13. A lightpipe switch device as set forth in claim 12, including an input lens means mounted inside said optical input channel in fixed position relative to said first supporting structure for collimating and directing light from the main trunk lightpipe line toward said optical means mounted within said optical input channel.

14. A lightpipe switch device as set forth in claim 12, wherein said second supporting structure slides with respect to said first supporting structure.

15. A lightpipe switch device as set forth in claim 14, wherein said second supporting structure includes a toothed track means for engaging a rotating gear such that said second supporting structure slides relative to said first supporting structure in response to rotation of the gear.

16. A lightpipe switch apparatus as set forth in claim 12, wherein said second supporting structure rotates relative to said first supporting structure.

17. A lightpipe switch apparatus as set forth in claim 16, wherein said second supporting structure is circular in shape and said optical input channel includes a first segment formed in alignment with the axis of revolution of said second supporting structure and a second segment radially formed with respect to the axis of revolution of said second supporting structure.

18. A lightpipe switch apparatus as set forth in claim 17, wherein said first supporting structure includes a circular cavity for mounting said second supporting structure and said plurality of optical output channels respectively radiate outward from said cavity.

19. An optical coupler apparatus comprising:

(a) a lightpipe assembly including a plurality of optical fiber bundles surrounded by at least one layer of protective material, each of said plurality of optical fiber bundles including a plurality of optical fibers, each having a core material surrounded by at least one layer of cladding material, said plurality of optical fibers being loosely arranged in a first region of said lightpipe assembly and being brought into contact with one another, and the cladding material between adjacent optical fibers removed in a second region of said lightpipe assembly, and the core material from said plurality of optical fibers being fused into a single rod element in a third region of said lightpipe assembly;

(b) a hollow inner sleeve structure which receives said lightpipe assembly and which surrounds at least said second and third regions of said lightpipe assembly;

(c) a hollow outer sleeve structure which surrounds at least a portion of said hollow inner sleeve structure to define a cavity therebetween, said cavity having a volume sufficient to receive said layer of protective material in said lightpipe assembly while said hollow inner sleeve surrounds said second and third regions of said lightpipe assmebly;

(d) an optical mixing means mounted within said hollow inner sleeve structure to receive light from said single rod element and to uniformly disperse light so received throughout the cross-sectional area of said hollow inner sleeve structure; and (e) a lens means mounted within said hollow inner sleeve structure to receive light from said optical mixing means and to focus light so received into a light beam which exits from said hollow inner sleeve structure along an optical axis such that the intensity of said light beam is greatest at said optical axis.

20. A lightpipe socket structure for removably receiving a male optical coupler of an optical device and for transmitting light from a light source to the male optical coupler only after the male optical coupler has been received by said lightpipe socket structure, comprising:

(a) a female optical coupler including a sleeve portion having a central bore into which the male optical coupler is inserted, (b) beam forming means for receiving light from the light source and for directing light in the form of a beam along a predetermined path which angularly intersects the central longitudinal axis of said central bore;

(c) light redirecting means mounted for reciprocating movement along the central longitudinal axis of said central bore and operative to redirect said beam from said beam forming means toward said female optical coupler, said light redirecting means including a first optical window means for receiving said beam from said beam forming means, a second optical window means aligned with said central bore in said female optical coupler for passing light into said central bore, and optical means for transmitting said beam from said first optical window means to said second optical window means;

(d) biasing means for contacting said light redirecting means to normally bias said light redirecting means to a first position wherein said first optical window means is out of the path of said beam; and (e) actuating means extending from said light redirecting means for contacting said male optical coupler when said male optical coupler is inserted into said central bore to move said first optical window means to a second position in the path of said beam.

21. The lightpipe socket structure of claim 20 wherein said light redirecting means reflects light back into said beam forming means when said light redirecting means is in said first position.

* * * * *